US010353091B2

(12) United States Patent
Purves et al.

(10) Patent No.: US 10,353,091 B2
(45) Date of Patent: Jul. 16, 2019

(54) ENHANCED VISUALIZATION OF GEOLOGIC FEATURES IN 3D SEISMIC SURVEY DATA USING HIGH DEFINITION FREQUENCY DECOMPOSITION (HDFD)

(71) Applicant: Foster Findlay Associates Limited, New Castle upon Tyne, Tyne and Wear (GB)

(72) Inventors: Stephen James Purves, San Cristobal de la Laguna (ES); Adam John Eckersley, Whitley Bay (GB); Nicholas McArdle, Aberdeen Aberdeenshire (GB)

(73) Assignee: Foster Findlay Associates Limited, Tyne and Wear (GB)

( * ) Notice: Subject to any disclaimer, the term of this patent is extended or adjusted under 35 U.S.C. 154(b) by 0 days.

(21) Appl. No.: 14/900,096

(22) PCT Filed: Feb. 14, 2014

(86) PCT No.: PCT/GB2014/050442
§ 371 (c)(1),
(2) Date: Dec. 18, 2015

(87) PCT Pub. No.: WO2015/004416
PCT Pub. Date: Jan. 15, 2015

(65) Prior Publication Data
US 2016/0146959 A1 May 26, 2016

(30) Foreign Application Priority Data

Jul. 12, 2013 (GB) .................................. 1312521.6

(51) Int. Cl.
*G01V 1/00* (2006.01)
*G01V 1/30* (2006.01)
*G01V 1/34* (2006.01)

(52) U.S. Cl.
CPC .............. *G01V 1/302* (2013.01); *G01V 1/345* (2013.01); *G01V 2210/23* (2013.01);
(Continued)

(58) Field of Classification Search
CPC ...... G01V 1/30; G01V 1/302; G01V 2210/23; G01V 2210/24; G01V 2210/30; G01V 2210/74; G01V 1/00; G01V 1/345
(Continued)

(56) References Cited

U.S. PATENT DOCUMENTS 6,594,585 B1 * 7/2003 Gersztenkorn .......... G01V 1/30
702/14
2005/0010366 A1 1/2005 Castagna

OTHER PUBLICATIONS

XP035099828, China, Aug. 7, 2012, Zhao.
(Continued)

*Primary Examiner* — Sujoy K Kundu
*Assistant Examiner* — Lynda Dinh
(74) *Attorney, Agent, or Firm* — Workman Nydegger

(57) ABSTRACT

Visually enhancing a geological feature in 3D seismic survey data may include selecting a first seismic trace from a 3D seismic survey dataset. Said first seismic trace is subdivided into a plurality of identified characteristic segments. At least one first analytical model function is generated for each of said plurality of identified characteristic segments. At least one adapted wavelet from an existing dictionary is utilized. A matching characteristic is determined between said first seismic trace and said at least one first analytical model function. Said at least one first analytical model function is optimized with respect to said matching characteristic. Both determining a matching characteristic, and optimizing said at least one first analytical model function, are repeated until a predetermined condition is met. A model dataset is generated from said optimized at
(Continued)

least one first analytical model function for at least part of said first seismic trace for visual representation.

25 Claims, 17 Drawing Sheets

(52) U.S. Cl.
CPC ...... *G01V 2210/24* (2013.01); *G01V 2210/30* (2013.01); *G01V 2210/74* (2013.01)

(58) Field of Classification Search
USPC .......................................................... 702/16
See application file for complete search history.

(56) References Cited

OTHER PUBLICATIONS

XP001557697, China, Jul. 1, 2010, Wang.
International Search Report and Written Opinion, U.K. Application No. PCT/GB2014/050442, dated Sep. 5, 2014 (12 pages).
IPRR Report and Cited Prior Art , U.K. Application No. PCT/GB2014/050442, dated Oct. 3, 2015 (46 pages).

\* cited by examiner

ENHANCED VISUALIZATION OF GEOLOGIC FEATURES IN 3D SEISMIC SURVEY DATA USING HIGH DEFINITION FREQUENCY DECOMPOSITION (HDFD)

CROSS-REFERENCE TO RELATED APPLICATIONS

This application claims the benefit of International Application No. PCT/GB14/50442, filed Feb. 14, 2014, titled ENHANCED VISUALIZATION OF GEOLOGIC FEATURES IN 3D SEISMIC SURVEY DATA USING HIGH DEFINITION FREQUENCY DECOMPOSITION (HDFD).

The present invention relates generally to the field of oil and gas exploration, and in particular to the field of computer aided exploration for hydrocarbons using geophysical data, such as for example seismic data, of the earth. Even more particular, the present invention relates to the analysis of seismic trace data and its enhanced visual representation through a method of high definition frequency decomposition of the seismic traces.

INTRODUCTION

In the oil and gas industry, geological data surveys such as, for example, seismic prospecting and other similar techniques are commonly used to aid in the search for and evaluation of subterranean hydrocarbon deposits. As an example, prospecting operations include three basic stages (i) data acquisition, (ii) data processing and (iii) data interpretation. The success of the prospecting operation generally depends on satisfactory completion of (i), (ii) and (iii). For example, a seismic source is used to generate an acoustic signal that propagates into the earth and that is at least partially reflected by subsurface seismic reflectors. The reflected signals are then detected and recorded by an array of seismic receivers located at or near the surface of the earth, in an overlying body of water, or at known depths of boreholes.

FIG. 1, for example, shows a typical setup for offshore seismic surveys, where a large seismic survey vessel 10 is used to tow acoustic receivers 12, also known as streamers, suspended below the surface, which carry hydrophones (not shown). During data acquisition, sound waves 14 are transmitted from the vessel 10 using compressed air guns 16 and which travel down through the seabed and reflect back from the different layers (strata) of rock 18, 20, 22. The reflected sound waves 14 are then received by the hydrophones (not shown) located along the seismic streamers which, when processed, can be used to provide a visual representation (2D, 3D) of the substrata.

Typical seismic traces of the reflections (amplitudes) are shown in FIG. 2. The data shown in FIG. 2 has been migrated ("poststack"), i.e. the amplitudes of the traces are moved to their true subsurface position (depth) to eliminate any offset between the source and receiver. Thus, the poststack seismic reflectivity data comprises of a processed acoustic record of subsurface reflections occurring at many different points within the earth's subsurface. In the field of oil and gas exploration and production, specially trained geoscientists would then interpret images of this poststack data in order to develop a model of the subsurface mapping geological features based on the shape and extent of the reflectors within the dataset.

However, the seismic signal is a rich source of information on the subsurface containing much more information than can be visually assessed from these poststack sections alone. Consequently, computational approaches to seismic interpretation have become more important in recent years in order to allow more of this information to be extracted and made available for interpretation. The wider depth of information provides an additional insight during interpretation and significantly improves the reliability of resulting geological models, which in turn can increase profitability of Oil and Gas exploitation projects.

In order to extract more information form the seismic data, various techniques have been utilized. For example, spectral decomposition (Partyka et al., 1999, *"Interpretational aspects of spectral decomposition in reservoir characterisation: The Leading Edge"*, 18, 353-360) of seismic traces has proven a very successful technique to access information that would otherwise be locked away within the seismic data. In particular, the isolation of individual sets of frequencies allows geoscientists to look at the reflections across a new dimension, so as to illuminate geological formations using specific property subsets, thus providing significantly more detailed information that can be used for interpretation.

Other well known frequency decomposition techniques are:

Fourier Transform

The Fourier Transform is a fundamental way of decomposing and describing any band-limited periodic signal by representing it as a linear sum of sinusoidal waves as follows:

$$X(\omega) = 1/N \sum_{n=-\infty}^{\infty} x[n] e^{-i\omega n} \qquad (\text{Eq. 1})$$

In Eq. 1, $x[n]$ is the time domain signal and $X(\omega)$ is the Fourier transform of $x[n]$. The Fourier transform projects the entire source signal onto sinusoidal functions of the same length in order to produce frequency coefficients in the form of a discrete spectrum.

Therefore, the Fourier transform provides a view of the signal in terms of frequency alone and provides the best possible frequency resolution for a discrete signal where a frequency coefficient is provided at each $F_S/(N-1)$, where N is the number of samples of the input signal and $F_S$ is the sampling frequency.

However, as the sinusoidal basis functions of the Fourier transform extend for the entire length of the signal, although it is possible to determine a frequency quite precisely, it is not possible to determine where within the source signal that frequency occurred. The Fourier transform example also highlights an edge case of a well known problem, called the time-frequency resolution problem often considered as equivalent to the Heisenberg uncertainty principle in quantum physics. First highlighted by Denis Gabor in his paper titled "Theory of Communication" (1945), the uncertainty principle for time-frequency transforms sets a lower bound of the joint time-frequency resolution that is achievable. This means that by increasing the resolution in frequency, the resolution in time is lost and vice versa. This limit applies to all linear time-frequency transformations.

Time-Frequency Analysis

Although the Fourier transform is a useful tool for frequency decomposition, it has significant limitations in cases where a signal is non stationary, or in applications when trying to isolate signal packet with particular frequency properties.

Time-frequency analysis techniques allow to "trade-off" frequency resolution in exchange for improved time resolution. This is possible by using basis functions that are compact and span only a fraction of the source signal.

FIG. 3 shows an example of common methods for representing the properties of different time-frequency transformations by using a tiling that shows the distribution of basis functions used in the transform and their extent in terms of time and frequency axes. The diagrams on the top left and top right of FIG. 3 show the two edge cases of time-series and Fourier transform, wherein the diagrams at the bottom left and the bottom right show the well known and popular time-frequency techniques of short-time Fourier transform and wavelet transform.

In particular, the time-series diagram is a representation of the signal isolating the signal energy precisely at any point in time, but without being able to determine its frequency. The Fourier transform allows the isolation of the signals energy at a particular frequency, but without being able to determine the point in time that energy is present. The short-time Fourier transform provides a compromise in which the Fourier transform is applied in short non-overlapping blocks in order to produce a uniform tiling. However, this technique is rarely used. The wavelet transform is a scale-space based transform, which takes advantage of the "uncertainty principle" limitation to the inherent time-frequency properties of the signal, i.e. a large scale/low frequency component of a signal is by definition poorly localised in time and well localised in frequency. A small scale component of the signal is high frequency and poorly localised in frequency (it has a broad band frequency response). In the diagram in FIG. 3, this is shown by the non-uniform tiling, which is achieved as a result of linear dilations of a single wavelet basis function.

Frequency Decomposition with Filter Banks

This approach is essentially a wavelet transform approach to frequency decomposition but one "without a frame". Since this technique only uses signal decomposition and does not provide inverse transforms of the results, scale and design of the wavelet filters in the analysis scheme provides more flexibility and also allows oversampling, therefore reducing potential complications with boundary effects.

Therefore, varying the parameters of the algorithm allows a user to design a time frequency tiling as required, both in terms of placement and overlap, before applying it to the data.

The technique provides for two modes of operation (i) "constant bandwidth", i.e. selecting better frequency localisation, and (ii) "constant Q", i.e. selecting better frequency localisation. The "constant Q" technique, for example, has the advantage of using so called Gabor Wavelet filters of varying lengths, each suited for the scale of analysis at hand, meaning that optimal time localisation was achieved for each frequency analysed. However, these wavelet techniques still involve applying a filter to the data and, as such, introduce an additional smoothing effect to the data. When applied to seismic sections, this means that the band-limited data outputs are still of a lower resolution than that produced by the original seismic data.

Adaptive Scale Space Analysis (HDFD/Matching Pursuit)

These techniques differ significantly from the techniques discussed previously in that they are not linear transforms.

Adaptive scale space analysis techniques are instead lossy, non-invertible analysis algorithms that build an analytical representation of the input signal (approximate). In this context, "analytical" means that the resulting representation could be written down in full mathematical form (at least in theory). The representation would then take the form of a sum series ($\Sigma$) of parameterised wavelets that, when superposed, approximate the original signal.

(a) Basic Matching Pursuit Algorithm

The standard Matching Pursuit algorithm (Mallat & Zhang, 1993) is a highly versatile, generic method to decompose any type of signal into elements (so called "atoms") taken from a pre-defined "dictionary" of parameterised functions. Using this method a signal can be composed of small short time-window functions in the same way that a sentence is constructed from a dictionary of words.

When applied to time-frequency decomposition, the dictionary of functions is defined as containing "dilations, translations and modulations of a single window function". For example, complex Gabor atoms are utilised for this purpose, defined by applying a Gaussian window to a complex periodic signal with a discrete range of scales (equivalently, frequencies).

Also, Matching Pursuit is a greedy deterministic technique which, at each iteration, seeks to match the atom from the dictionary, which maximally reduces the residual signal left behind after the matched atom is subtracted from the signal. This process continues to iteratively match atoms from the dictionary to the residual left from the previous iteration. This is a convergent process that can be terminated once the residual energy falls below a given threshold or after a pre-defined number of atoms have been matched to the signal.

Matching Pursuit has the advantage of being very flexible and generic, in addition to guaranteed convergence based on a chosen objective function.

However, its generic capability is also one of its disadvantages when applied to time-frequency analysis of seismic data. This is due to the fact that the algorithm is purely mathematical and, given its greedy nature, it will simply match a succession of atoms with the sole purpose of minimising the trace residue. This can lead to decompositions containing atoms that bear no relation to the seismic trace as they were matched to an arbitrary residue during the iterative process. Another disadvantage is that the residue-based decomposition into atoms, whose shape and polarity in no way matches the seismic trace, remained, albeit in a reduced form.

For example, a generic Matching Pursuit algorithm is adapted to perform the following steps:

Define a dictionary of atoms, D, a choice function C, and a stopping condition. Let f(t) represent the seismic trace over a time window $[t_1, t_2]$ and let $Rf_0 = f(t)$, where $Rf_i$ is the residual of f after i iterations of Matching Pursuit.

Repeat from i=1 until stopping condition is satisfied.

Select the atom, $g_i$, from D, which best matches the residue $Rf_{i-1}$ according to the choice function C and determine its weighting $a_i$ $$\text{Set } Rf_i = Rf_{i-1} - a_i g_i \tag{Eq. 2}$$

$$\text{and let } f_i(t) = f(t) - Rf_i = \sum_{j=1}^{i} a_j g_j \tag{Eq. 3}$$

be the approximation of f by i atoms.

Let n be the total number of iterations performed. Then, $$f = \sum_{j=1}^{n} a_j g_j + Rf_n \tag{Eq. 4}$$

gives the n atom approximation of f with Rf the final residue.

Consequently, Matching Pursuit decomposition does not work well on seismic data due to some significant detrimental effects. Also, when using Matching Pursuit decomposition for the purposes of Spectral Analysis/Decomposition (as it was originally conceived for signal compression), it is important that elements of the time domain signal are well represented by atoms with similar local spectral properties.

In particular, in complicated parts of a seismic trace, for example, where there were interference effects, which are natural and common in seismic, the greedy nature of Matching Pursuit would often fit an atom that left a significant amount of residual energy. Subsequently, the algorithm would add more atoms to compensate, in an almost oscillatory manner, ultimately adding many more atoms to the model than required. This has a significant detrimental impact on the overall performance and results in very unrealistic and overly complex models.

Also, once the main high energy events were matched, Matching Pursuit decomposition tends to "mop up" energy by fitting lots of high frequency atoms. This leads to signal energy in the main seismic band not being correctly represented potentially causing problems during reconstruction.

Matching Pursuit decomposition has also no constraints that would encourage it to find solutions where fewer, better fitting atoms were used to represent a particular trace or part thereof, leading to poorly placed atoms (in terms of their spectral properties) in general for spectral decomposition purposes.

In a typical example, Matching Pursuit decomposition may fit one atom on each pass, which is added to the signal representation. The signal representation is then used to reconstruct the signal matched so far and which is subtracted from the original signal to create a residual signal. The next pass of the algorithm uses the residual, so if on a typical seismic trace one thousand atoms are fitted, for a dictionary with ten wavelets, ten thousand convolutions are made. The residual is then computed one thousand times, each time being progressively more expensive to do, to find and match an atom one thousand times. In a typical seismic volume, there are millions of traces, so using Matching Pursuit decomposition would be very prohibitive in practice.

Accordingly, it is an object of the present invention to provide a method and system that is adapted to provide a method for improving seismic interpretation, visually and qualitatively, using High Definition Frequency Decomposition (HDFD), without any of the disadvantages discussed above.

SUMMARY OF THE INVENTION

Preferred embodiment(s) of the invention seek to overcome one or more of the above disadvantages of the prior art.

According to a first aspect of the invention there is provided a method for visually enhancing at least one geological feature in 3D seismic survey data, comprising the steps of:
(a) selecting at least one first seismic trace from a 3D seismic survey data set; subdividing said at least one first seismic trace into a plurality of identified characteristic segments;
(b) generating at least one first analytical model function for each of said plurality of identified characteristic segments, utilizing at least one adapted wavelet from an existing dictionary;
(c) determining a matching characteristic between said at least one first seismic trace and said at least one first analytical model function;
(d) optimising said at least one first analytical model function with respect to said matching characteristic;
(e) repeating steps (d) and (e) until a predetermined condition is met, and
(f) generating a model dataset from said optimised at least one first analytical model function for at least part of said at least one first seismic trace for visual representation, and
wherein said predetermined condition in step (e) is any one of a minimum of the trace energy overestimate between said at least one first seismic trace and said at least one first analytical model function, or a joint minimum of the trace residual energy and the trace energy overestimate between said at least one first seismic trace and said at least one first analytical model function.

This provides the advantage that by using an intuitive criterion for the initial matching, allied to a process of co-optimising the amplitudes of overlapping atoms, better atom matches are achieved. Furthermore, the new method is a technique that affords a significant advantage to the geoscientist when applied to seismic trace data due to its ability to perform a decomposition of an input signal, whilst preserving its time domain resolution. That is, the decomposition can be performed without low pass filtering or applying any window function to the time domain signal. Consequently, this HDFD algorithm can be used successfully for spectral decomposition purposes, for example, to produce frequency decomposition colour blends that retain the original resolution of the seismic data. In addition, this method/algorithm is significantly faster than any of the currently available techniques, such as Matching Pursuits or Instantaneous Spectral Decomposition (ISD), making it a practical consideration for use in any commercial software product. Furthermore, the generated analytical signal model over the whole seismic dataset remains relatively small and tractable for storage.

Advantageously, the at least one first seismic trace may be subdivided utilizing an analytic trace envelope function for said at least one first seismic trace.

Advantageously, the characteristic segments may be identified salient events of said analytic trace envelope function.

Advantageously, the salient events may be characteristic peaks of said analytic trace envelope function for said at least one first seismic trace. Even more advantageously, the salient events may be intervals contained between pairs of troughs of said analytic trace envelope function for said at least one first seismic trace.

Preferably, in step (c) a plurality of wavelets may be utilized independently of each other from a plurality of existing dictionaries.

Advantageously, the matching characteristic in step (d) may be determined from a residual trace signal between said at least one first seismic trace and said at least one first analytical model function.

Advantageously, the at least one first analytical model function may be optimised so as to minimise a residual energy function with said at least one first seismic trace.

Advantageously, step (e) may include optimising said at least one adapted wavelet in respect of any one or all of the parameters such as amplitude, position, scale, frequency and phase.

Even more advantageously, step (e) may include the step of adding one or more adapted wavelets to said at least one first analytical model function.

Preferably, steps (c) through (f) may be repeatedly applied to subsequent residual traces in order generate adapted wavelets to further extend the first analytical model function.

Preferably, the model dataset may be a band-limited model dataset at a predetermined frequency of said at least one first seismic trace.

Preferably, the model dataset may be a triplet of band-limited model dataset at three predetermined frequencies of said at least one first seismic trace.

Alternatively, the model dataset may be at least one band-limited model dataset at a predetermined frequency of said at least one first seismic trace.

Alternatively, the model dataset may be an approximate reconstruction of the entire signal utilising the complete first analytical model function of said at least one first seismic trace.

Alternatively, the model dataset may be a representation of one or more of the adapted wavelet parameters of the first analytical model function of said at least one first seismic trace.

Advantageously, a plurality of seismic traces of a 3D seismic survey dataset may be processed in parallel.

Alternatively, a plurality of seismic traces of a 3D seismic survey dataset may be processed sequentially.

Alternatively, step (b) may include the step of sub-dividing said at least one first seismic trace into a plurality of band-limited frequency sections in addition to said plurality of identified characteristic segments.

This provides the advantage that wavelets are forced to be fitted/matched to the spectral extremes of the seismic trace, which would normally be overlooked, therefore further improving low-frequency wavelet matching between neighbouring traces, therefore, providing an improved colour resolution in the High Definition Frequency Decomposition of the seismic data.

Preferably, each one of said plurality of band-limited frequency sections may be defined by a predetermined lower and upper frequency limit that is different from said predetermined lower and upper frequency limit of any other of said plurality of band-limited frequency sections.

Alternatively, each one of said plurality of band-limited frequency sections may be defined by a lower and upper frequency limit derived from a predetermined peak power of a frequency power spectrum over a predetermined time period, wherein the upper frequency limit is at the uppermost frequency of the predetermined peak power and the lower frequency limit is at the lowermost frequency of the predetermined peak power.

Preferably, said at least one first seismic trace may be sub-divided into band-limited low-, mid- and high frequency sections.

Alternatively, each one of said plurality of band-limited frequency sections may be defined by a lower and upper frequency limit derived from the cumulative power distribution of said at least one first seismic trace.

Advantageously, said lower and upper frequency limits may be derived from predetermined quantiles of said cumulative power distribution.

Advantageously, said existing dictionary in step (c) may be extended by at least one octave above an uppermost frequency limit and at least one octave below a lowermost frequency limit of said plurality of band-limited frequency sections.

According to a third aspect of the invention there is provided a computer readable storage medium having embodied thereon a computer program, when executed by a computer processor that is configured to perform the method of the first aspect of the present invention.

BRIEF DESCRIPTION OF THE DRAWINGS

Preferred embodiments of the present invention will now be described, by way of example only and not in any limitative sense, with reference to the accompanying drawings, in which.

DETAILED DESCRIPTION OF THE PREFERRED EMBODIMENT(S)

The exemplary embodiments of this invention will be described in relation to interpretation of 3D seismic data. However, it should be appreciated that, in general, the system and method of this invention will work equally well for any other type of 3D data from any environment.

For purposes of explanation, it should be appreciated that the terms 'determine', 'calculate' and 'compute', and variations thereof, as used herein are used interchangeably and include any type of methodology, process, mathematical operation or technique. The terms 'generating' and 'adapting' are also used interchangeably describing any type of computer modelling technique for visual representation of a subterranean environment from geological survey data, such as 3D seismic data. In addition, the terms 'vertical' and 'horizontal' refer to the angular orientation with respect to the surface of the earth, i.e. a seismic data volume is orientated such that 'vertical' means substantially perpendicular to the general orientation of the ground surface of the earth (assuming the surface is substantially flat), and 'horizontal' means substantially parallel to the general orientation of the ground surface of the earth. In other words, a seismic data volume is therefore in alignment with respect to the surface of the earth so that the top of the seismic volume is towards the surface of the earth and the bottom of the seismic volume is towards the centre of the earth. Furthermore, the term 'atom' is generally known by the person skilled in the art and refers to an adapted wavelet from a dictionary of wavelets to generate an analytical model function.

Figure 1:
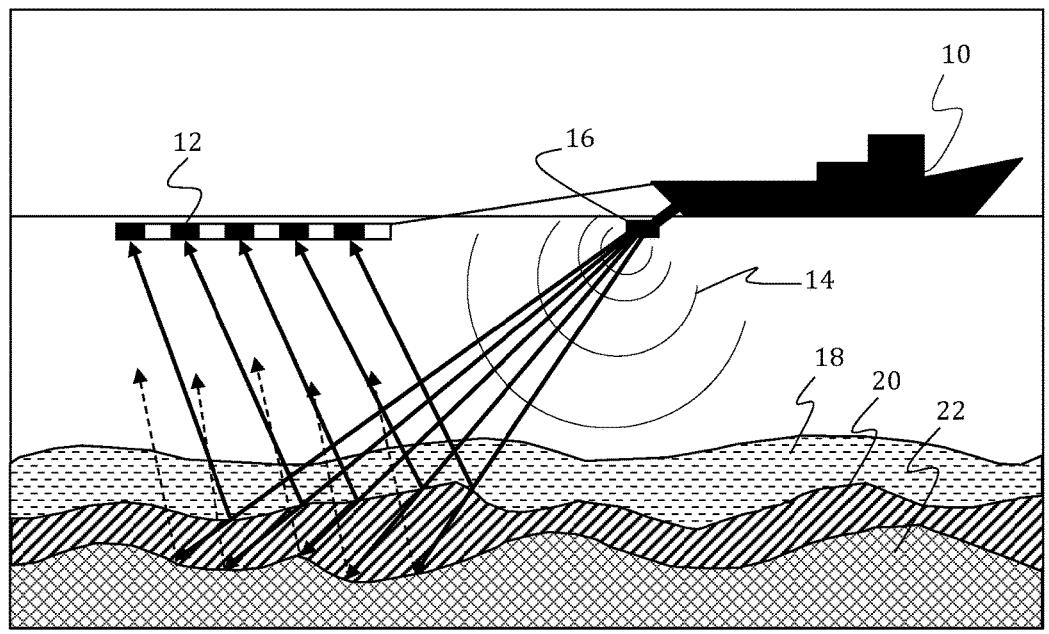
FIG. 1 shows a typical setup for an offshore seismic survey using an array of acoustic receivers (i.e. hydrophones) and sound waves generated by an air gun.
Figure 2:
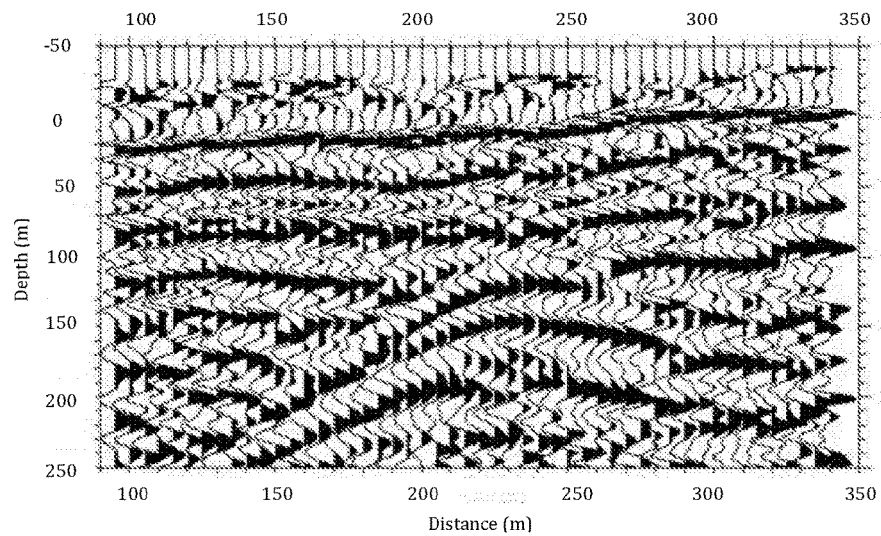
FIG. 2 shows a typical plot of migrated reflection traces recorded by the acoustic receivers after activating the air gun.
Figure 3:
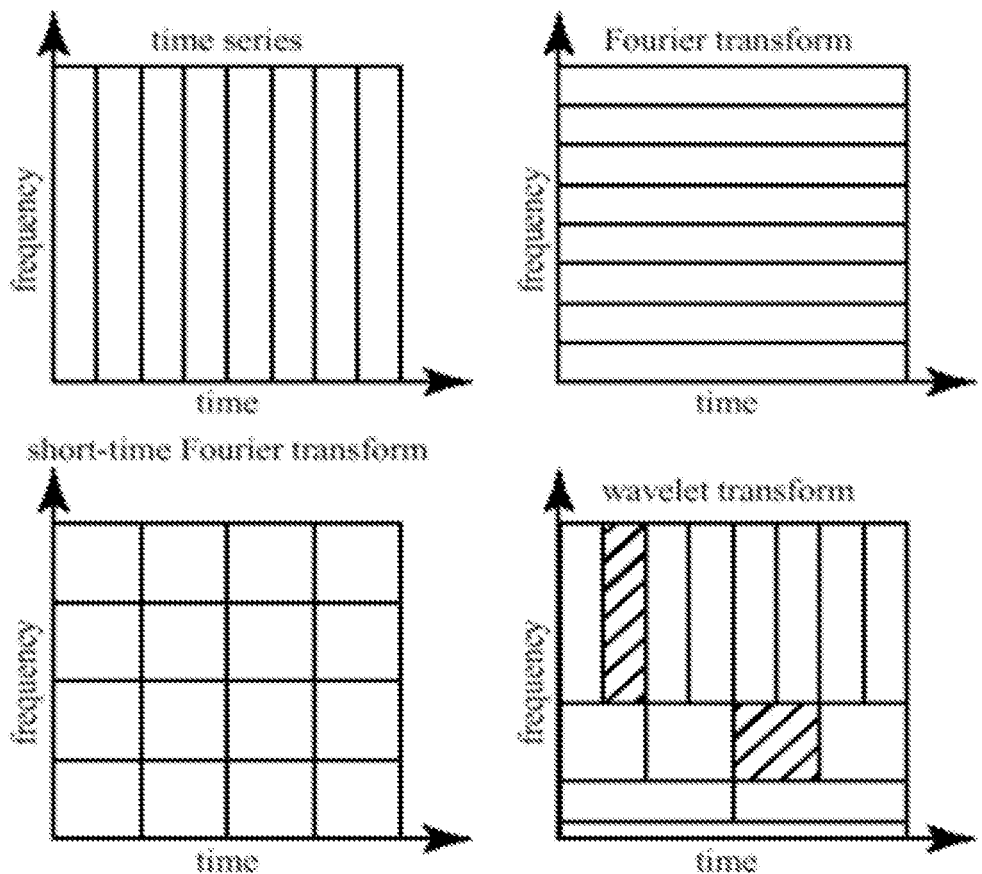
FIG. 3 shows known methods for representing properties of various time-frequency transformations by using a "tiling" that shows the distribution of basis functions used in the transform across time and frequency.
Figure 4:
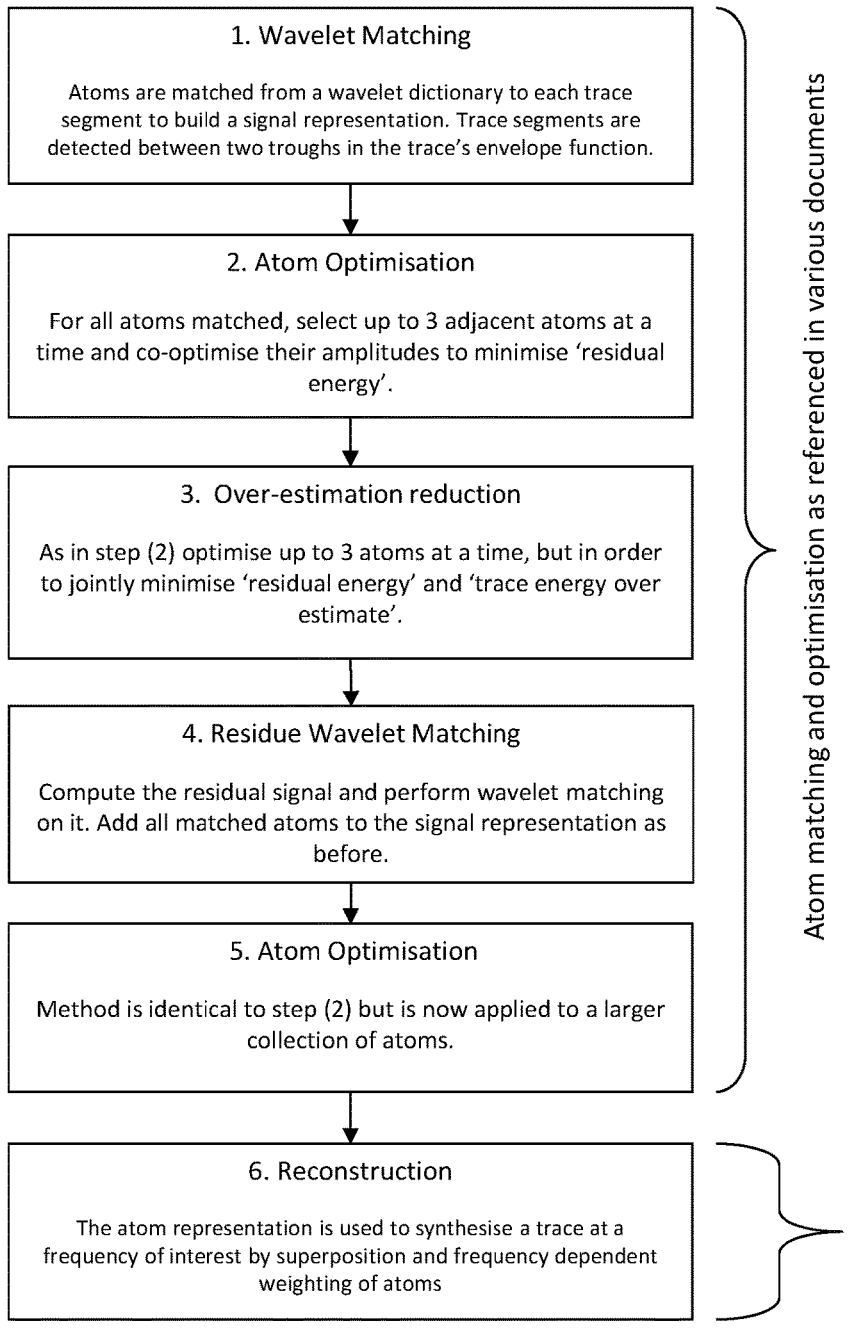
FIG. 4 is a top-level flow chart describing the HDFD method of the present invention including atom matching and optimisation, as well as, the HDFD reconstruction.

In the preferred embodiment of the present invention, the HDFD algorithm evolved from the previously described original Matching Pursuit variant into a multi-iterative technique, interleaving iterations of matching and of deterministic optimisation. Here, a single residue matching iteration is applied after the first round of matching and optimisation in order to fill in gaps left by the earlier matching. This allows the algorithm to obtain a high percentage of the trace energy within the decomposition without resorting to simply matching more and more atoms to arbitrary trace residues purely for the purpose of reducing the residual energy. In FIG. 4, a high-level flowchart shows the steps involved in the HDFD seismic trace decomposition process, including "wavelet matching", where atoms are matched at envelope peaks, "atom optimisation" and "over-estimation-reduction", where trace residue energy is reduced, "residue wavelet matching", where atoms are matched at envelope peaks of residue trace, another "atom optimisation" to reduce trace residue energy even further, and a "reconstruction" of the data.

Figure 5:
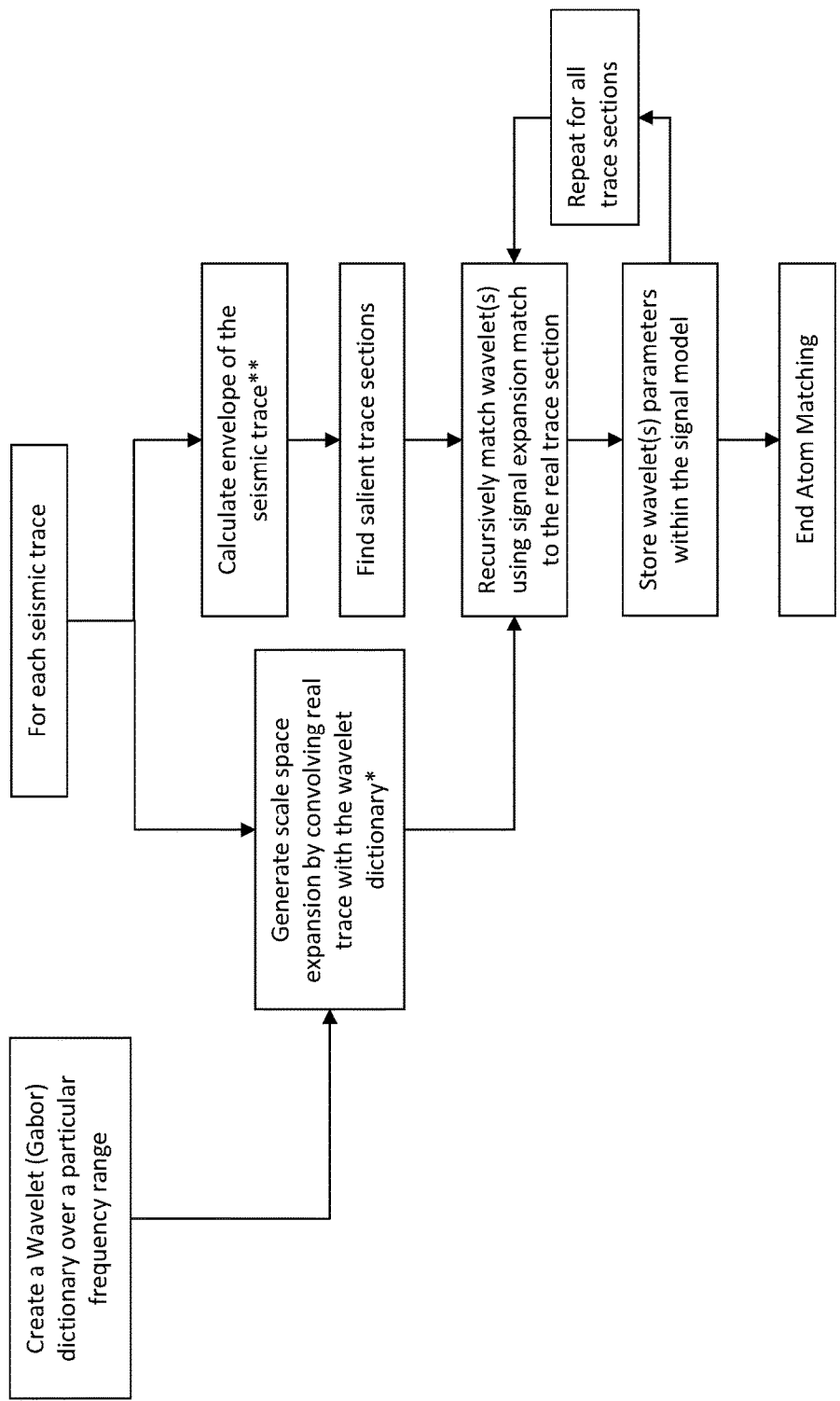
FIG. 5 is a lower-level flowchart describing the particular method of wavelet matching for the HDFD method of the described invention.
Figure 6:
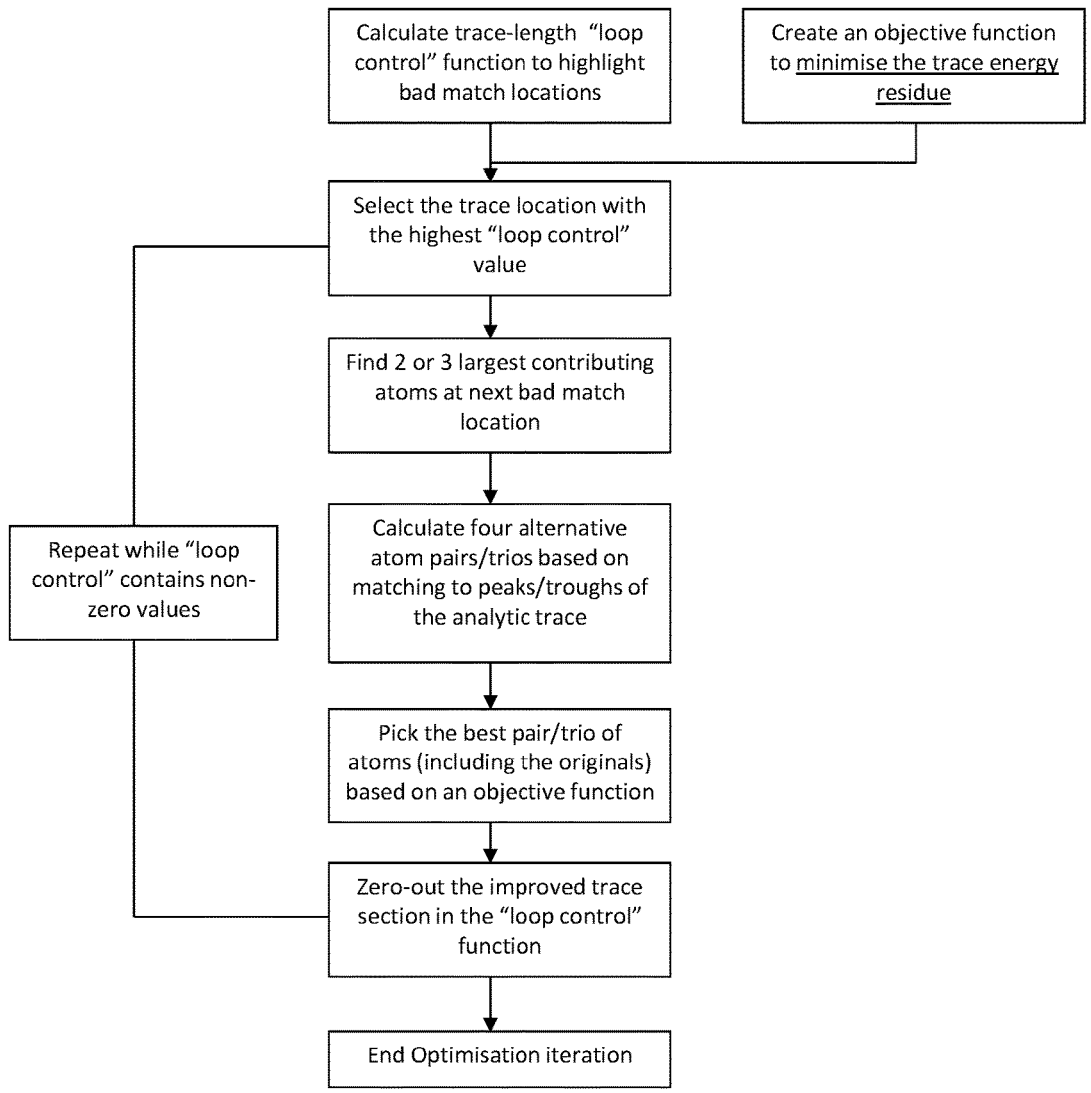
FIG. 6 is a lower-level flowchart of the particular method of atom optimisation for the HDFD method of the described invention.
Figure 7:
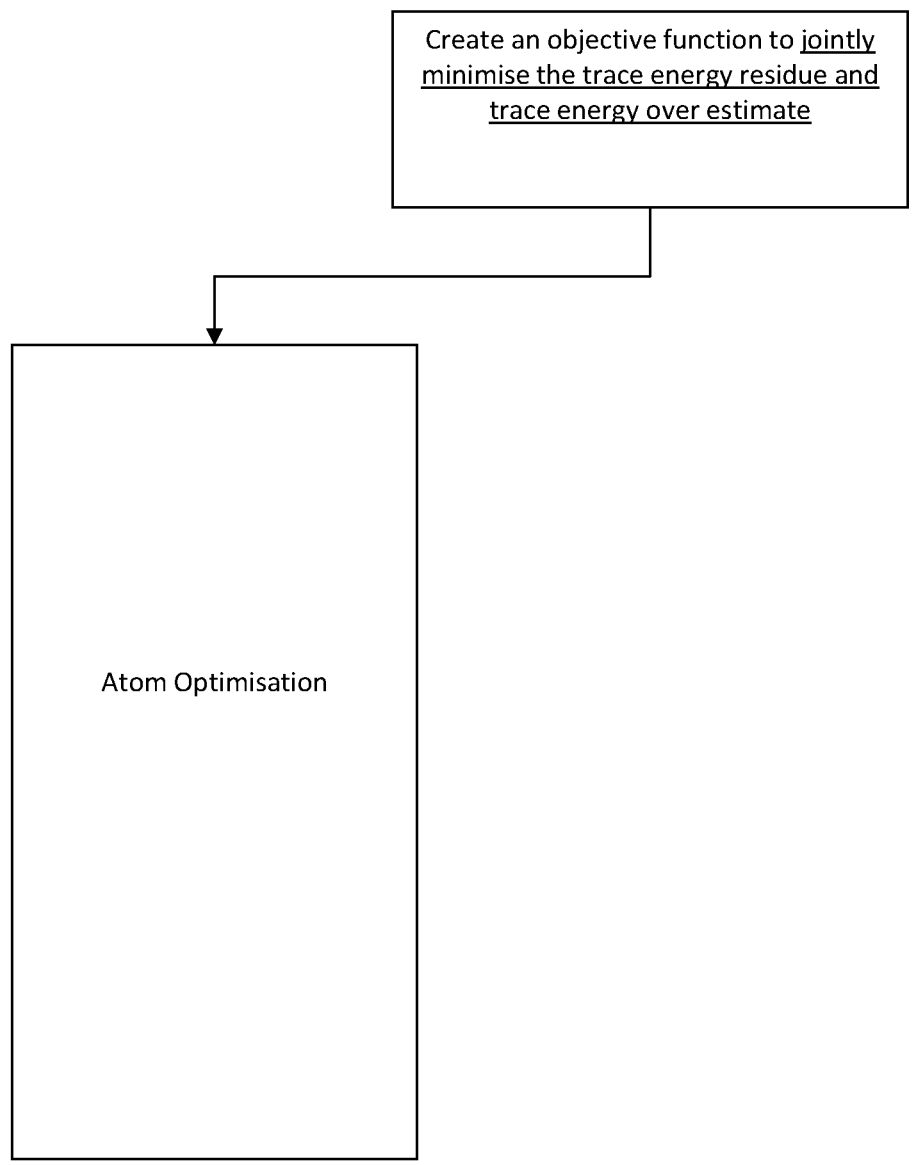
FIG. 7 is a lower-level flowchart of the over-estimation reduction optimisation.
Figure 8:
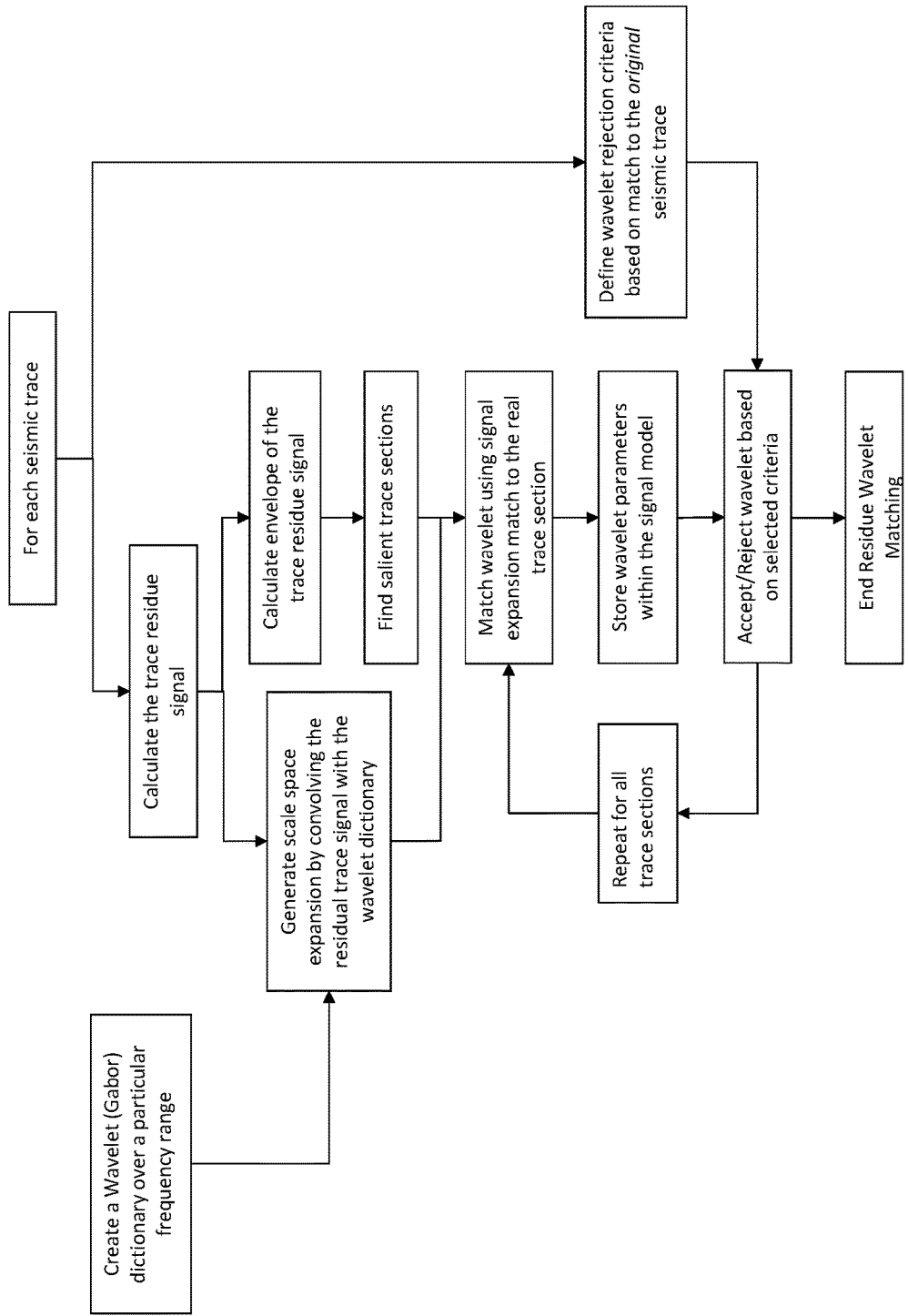
FIG. 8 is a lower-level flowchart describing the particular method of residual wavelet matching iteration for the HDFD method of the described invention.

FIG. 5 shows the detailed steps of the matching process, which differs from the known Matching Pursuit method in that the atoms are matched to all peaks in the analytic trace envelope rather than sequentially added to the location of highest energy. This means that no residue calculation is needed at this stage. Atoms are calculated to add to the decomposition independently for each envelope peak. FIGS. 6, 7 and 8 show flowcharts including detailed steps for "atom optimisation", "over-estimation reduction optimisation" and "residue wavelet matching iteration".

In particular, the discrete time-frequency Gabor expansion is still used to determine the best frequency/scale of the atom to match at the chosen location, as it is in Matching Pursuit. For example, quadratic interpolation is used to provide a more accurate frequency match to the data, which allows the time-frequency space to be relatively sparse on the frequency axis. Equivalently this means the atoms in the dictionary can be spread at frequencies of around 10 Hz, with the interpolation meaning it is possible to still add an atom of e.g. 34.2 Hz to best match the shape of the seismic trace.

Envelope peaks generally provide a good set of locations at which to centre the initially match atoms since they represent areas of highest trace energy. The fact that atoms are matched to all envelope peaks independently of each other means that, unlike in Matching Pursuit, the initial set of matched atoms may include significant overlaps, which cause large constructive or destructive interference.

Figure 9:
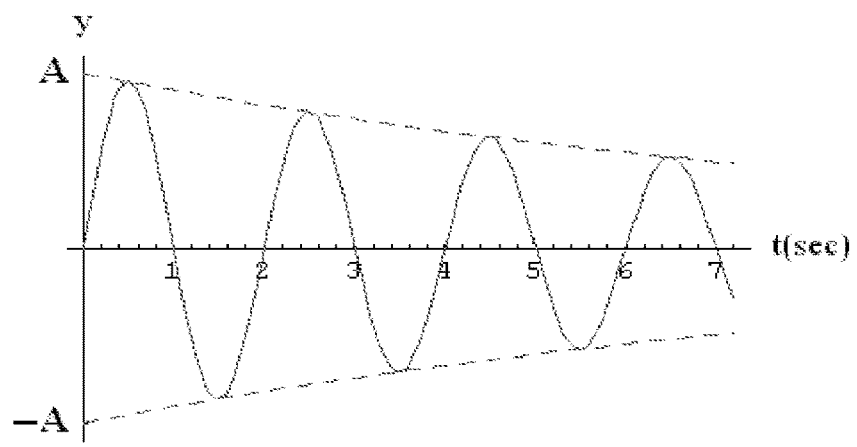
FIG. 9 discloses an example of an extreme case of inconsistent envelope peaks.

A significant problem which was identified with this approach was that the envelope peaks are not necessarily consistently placed. FIG. 9 shows an extreme example of a damped sinusoid which clearly has many "events" contained within it. However, the nature of the amplitude drop-off is such that the only identifiable peak in the envelope trace is at the highest amplitude.

However, in real seismic traces this effect is far less pronounced, but it can still lead to large gaps in the matching of atoms if one envelope peak covers many events. To solve this problem a recursive element was added to the envelope matching process.

Figure 10:
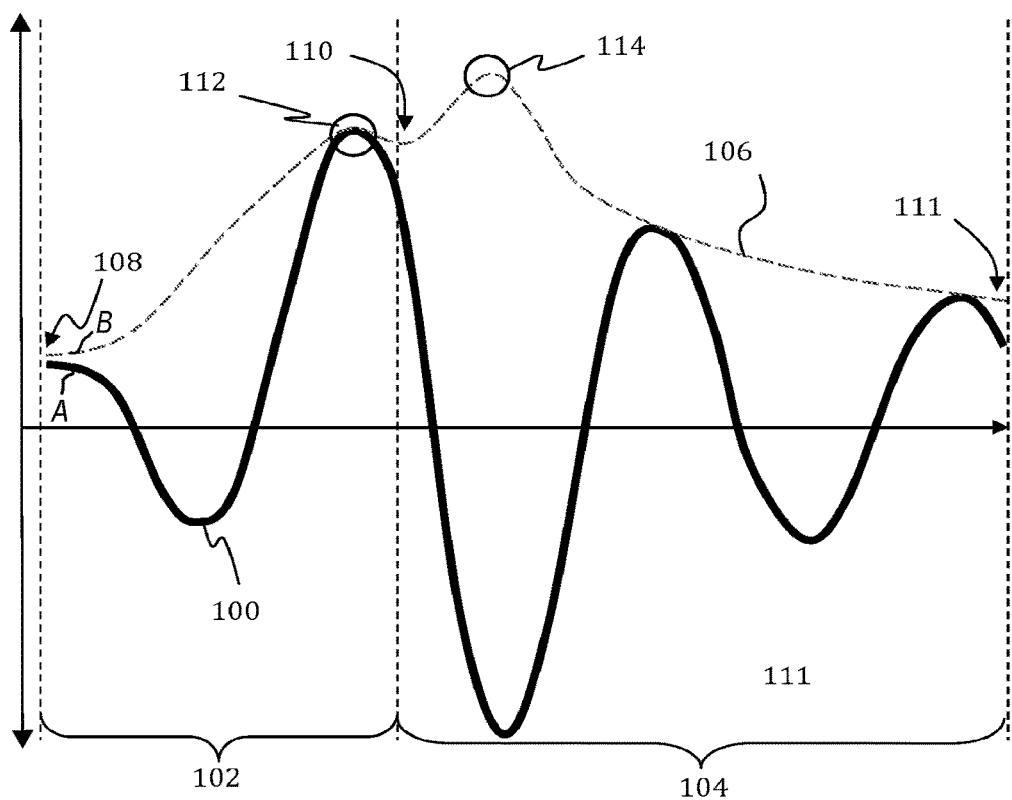
FIG. 10 shows an example seismic trace section with an envelope function and its identified peaks and troughs dividing the trace into two distinct sections.
Figure 11:
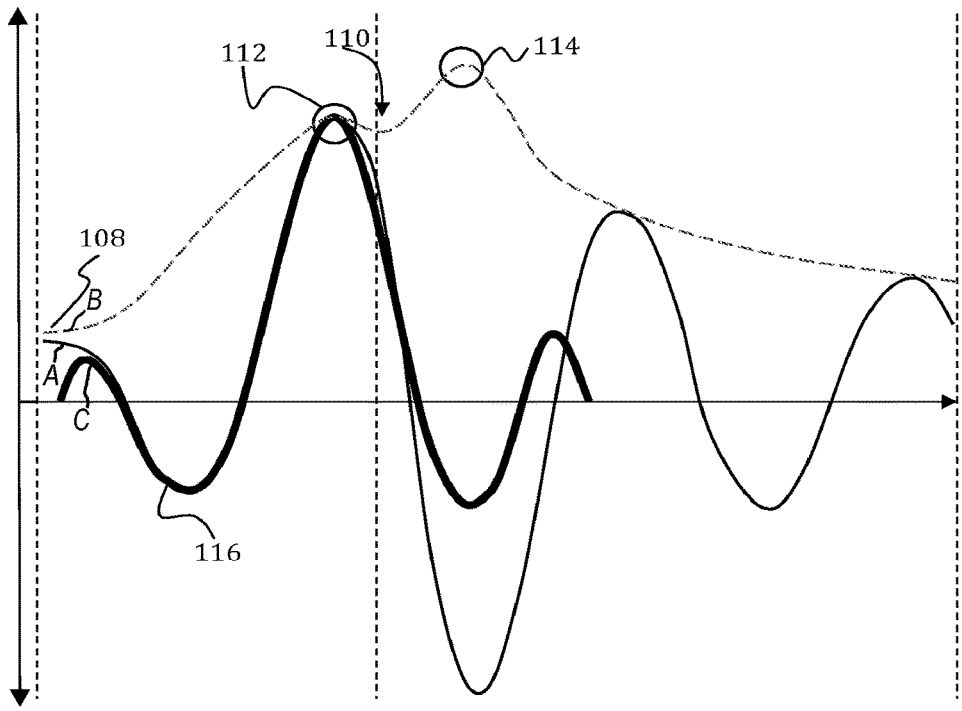
FIG. 11 shows the matching of the best fitted atom centred at the envelope peak of the first trace section.
Figure 12:
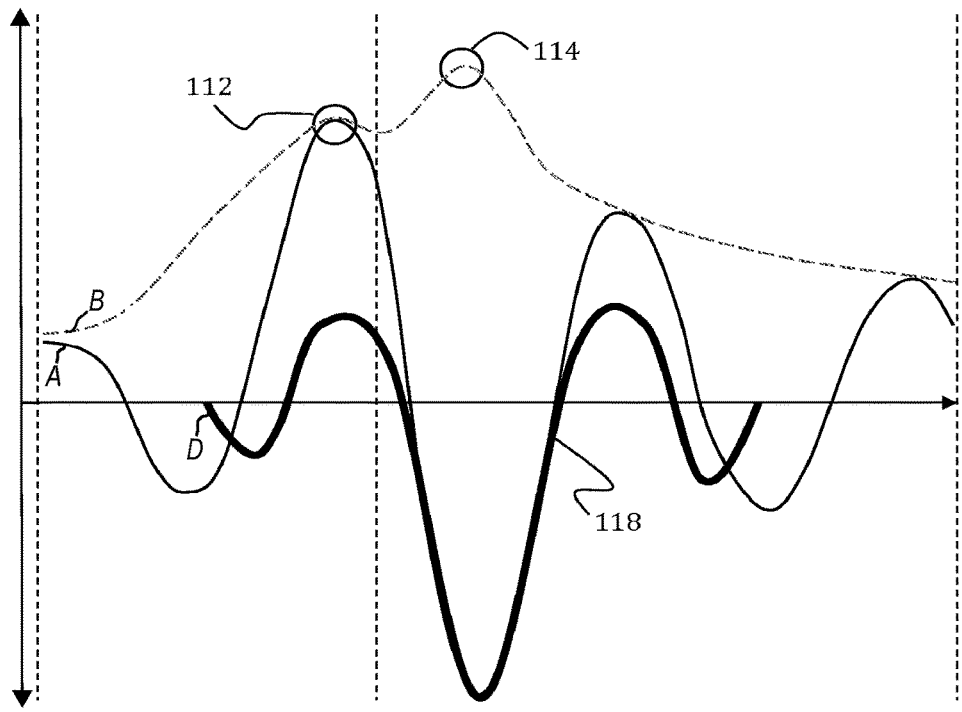
FIG. 12 shows the matching of the best fitted atom centred at the envelope peak of the second trace section.
Figure 13:
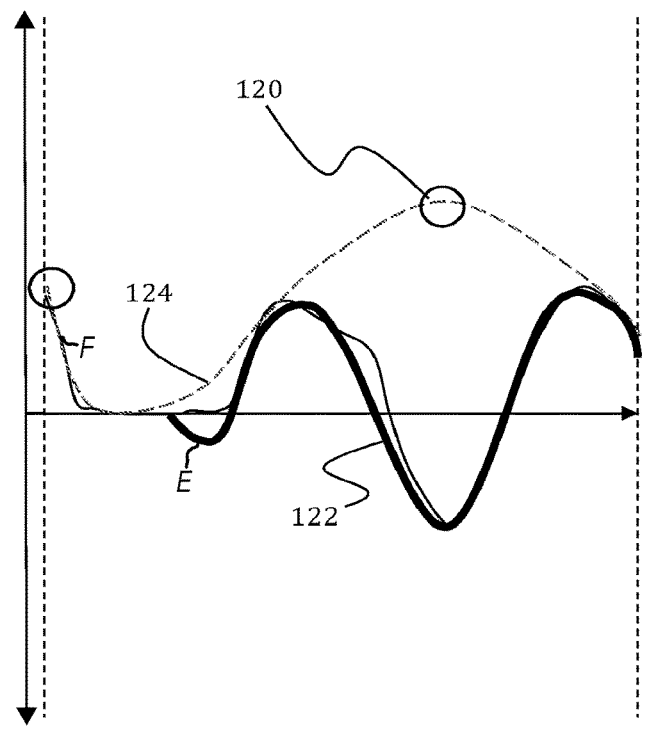
FIG. 13 shows the subtraction of the matched atoms for the first and second section from the seismic trace, and its new envelope.

Referring now to a representative example of the individual steps in FIGS. 10 to 12, the seismic trace 100 (also referenced as seismic trace A) is first divided up into independent sections 102, 104, delineated by an envelope 106 (also referenced as envelope B) and envelope troughs 108, 110, 111 as these give a good section of trace around each peak 112, 114 against which to correlate the atoms 116 (also referenced as atom C), 118 (also referenced as atom D) from a dictionary. Once the main envelope peak 112, 114 in a section 102, 104 has been matched, the percentage of trace energy matched for that block is calculated, as shown in FIG. 13, and if it is below a defined threshold a new envelope peak 120 within the same block is calculated by subtracting the matched atom.

This process continues until the trace section has been sufficiently matched.

Optimisation iteration, such as the residue reduction optimisation, is then applied to "tidy up" the decomposition created by the matching process.

Atoms 116, 118 matched at envelope peaks 112, 114, which are close together require some post-matching optimisation in order to correct the energy introduced (or cancelled out) by their overlap. In comparison, the known Matching Pursuit never encounters this problem, as it recalculates the trace residue to match after every atom is matched. However, as discussed above, this iterative residue matching is also responsible for many of the inappropriate atom matches produced by the known Matching Pursuit.

Figure 14:
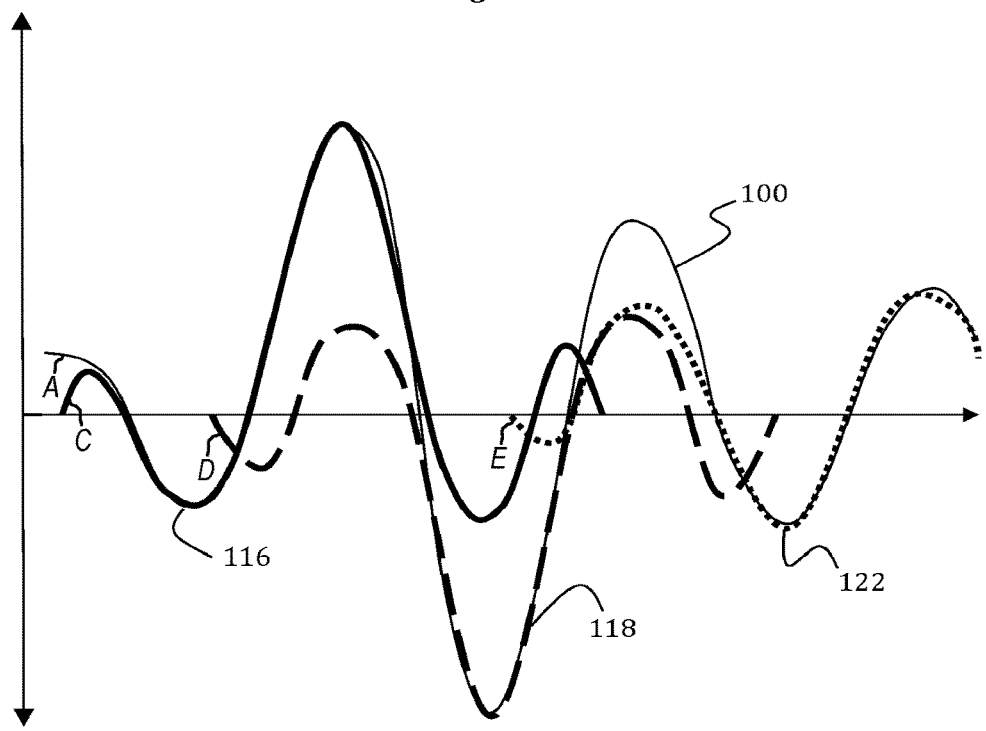
FIG. 14 shows a first matching pass, where atoms are matched at peaks of either the original seismic envelope or a small trace section residue during recursive matching, showing further significant overlaps between the atoms.
Figure 15:
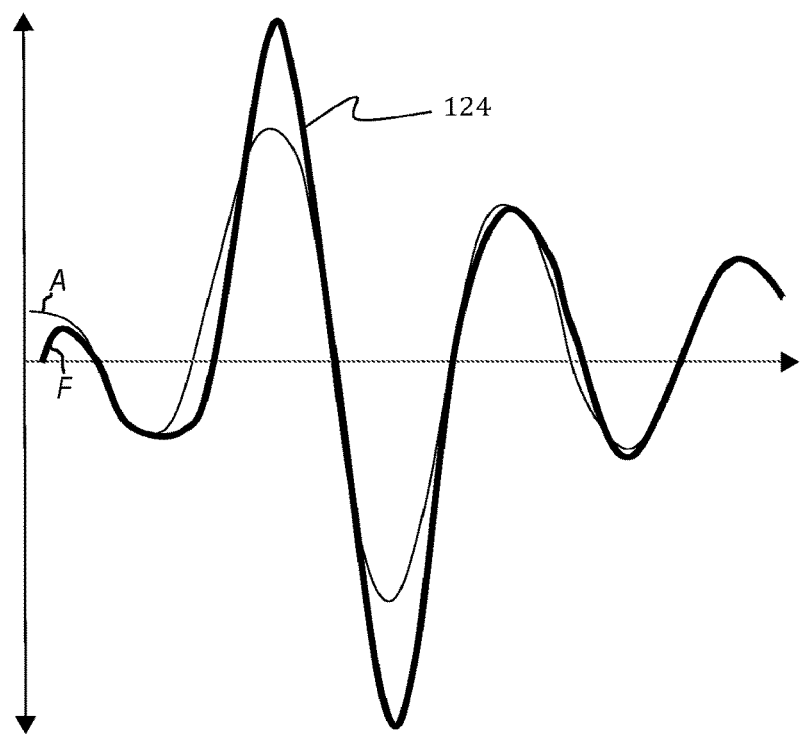
FIG. 15 shows the result of a first matching pass approximation, where the overlapping atoms that are matched at the envelope peaks provide significant constructive (or destructive) interference.

The individual steps of the process as shown in FIG. 10 to 13 are:

Calculating a seismic trace envelope 106 and finding its peaks 112, 114 and troughs 108, 110, 111;

Dividing the trace 100 into non-overlapping sections 102, 104 delineated by envelope troughs 108, 110;

Within each section 102, 104, take the dot product of every complex dictionary wavelet (each frequency) with the real-valued seismic section;

Using quadratic interpolation over the dot products will find the best fitting wavelet frequency, and the phase is determined from the real and complex values of the best dot product value;

Subtracting the matched atom from the trace section 100, recalculate envelope 121 over the residue within the same trace section, e.g. 104, and determine whether sufficient energy was matched (FIG. 13);

Adding further atoms by recalculating envelope of the remaining residue from each match, if the matched energy is below threshold recursively, e.g. matching a new atom 122 (also referenced as atom E) at the largest peak 120 of the new residue envelope 121;

FIG. 14 shows an example of a seismic trace section with three overlapping matched atoms 116, 118, 122. FIG. 14 shows the matching pass approximation 124 (also referenced as matching pass approximation F) of the overlapping atoms matched at envelope peaks shown in FIG. 13. The overlapping results in significant constructive (or destructive in some cases) interference.

Though the optimisation algorithm was included for the purpose of correcting these significant overlap problems, it also works effectively at improving more subtle overlapping effects between atoms throughout the trace. In particular after a second pass of atom matching has been performed, this optimisation attempts to find the best combination of parameters for overlapping atoms. This allows the algorithm to be less affected by the greediness bias of the matching than would otherwise be the case.

In a greedy algorithm (such as Matching Pursuit), the atoms which get matched first have higher amplitude, because they are matching as large an amount of trace energy as possible. As a result, atoms added later in the process which overlap those large early atoms will simply be "mopping up" residual trace energy. The optimisation pass of this HDFD algorithm is adapted to reduce this affect by successively co-optimising a pair or trio of overlapping atoms in order to find the best combined amplitudes for these. No bias is shown towards atoms added earlier in the process or whose pre-optimised amplitudes are significantly higher. This process does not change either the location or the frequency/scale of the atoms, only their amplitudes.

Figure 16:
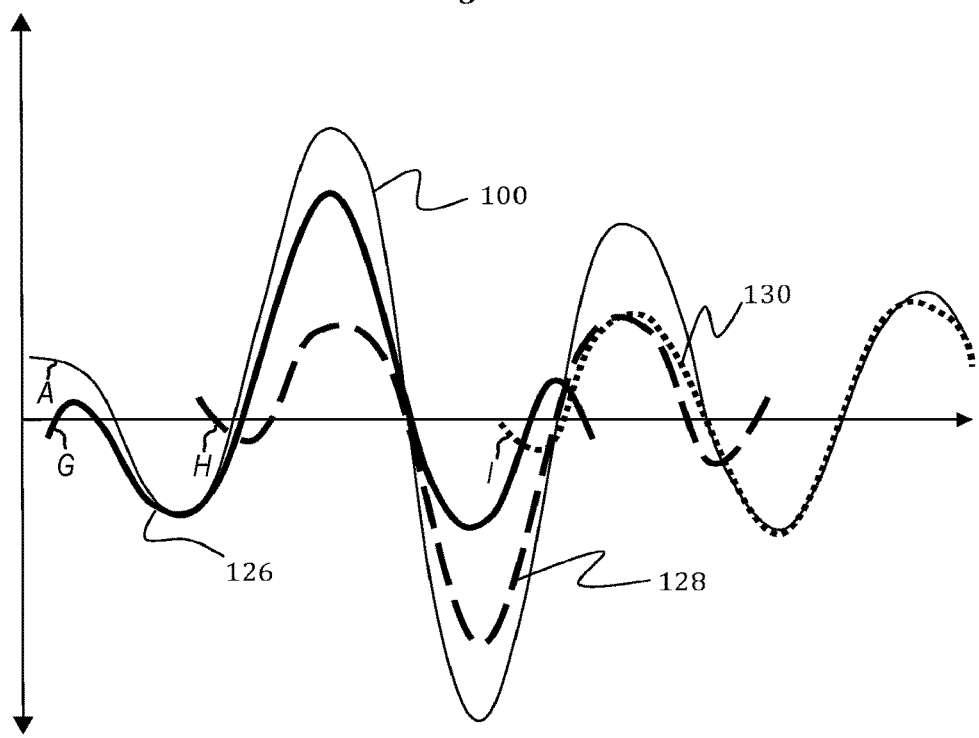
FIG. 16 shows a first optimisation pass, where atoms matched during the first matching pass have been co-optimised to find the best combination of amplitudes to fit the seismic trace over the region of the atoms' overlap.
Figure 17:
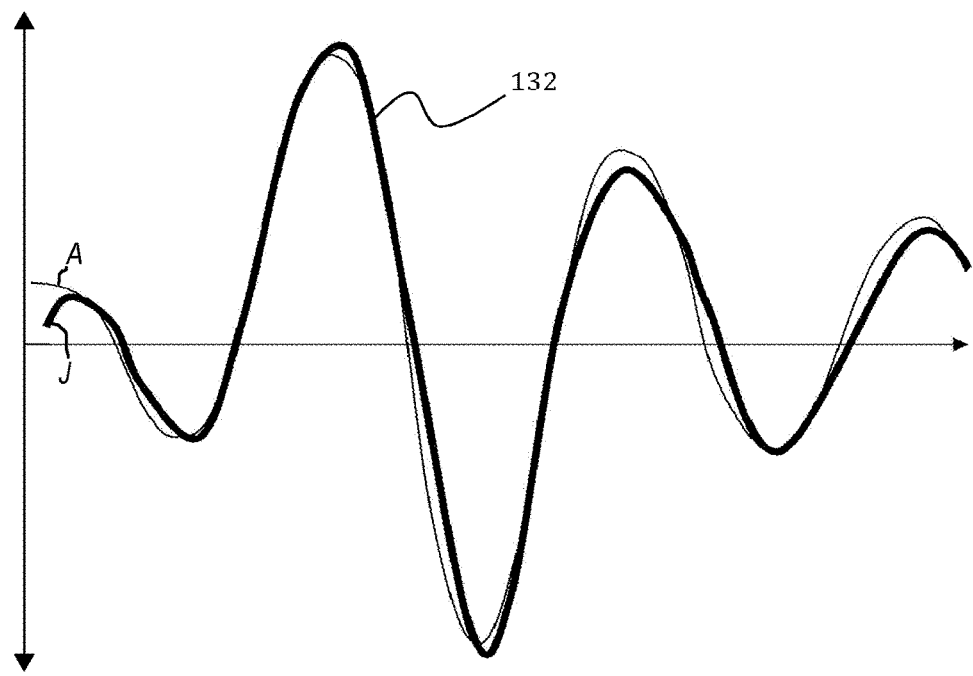
FIG. 17 shows the result of the first optimisation pass, where a better approximation to the seismic trace in region of constructive or destructive interference is provided between the atoms by the effect of co-optimising multiple atoms at once.

Referring now to FIGS. 16 and 17, atoms are selected for optimisation by finding the regions of the trace 100, which have the worst match as measured by residual energy. At these locations, up to 3 overlapping atoms 126 (also referenced as atom G), 128 (also referenced as atom H), 130 (also referenced as atom I) are selected and the region of overlap between them is used to setup a set of simultaneous equations (see Eq. 5). The system of equations is solved to find the set (A1, A2, A3), which best minimises the trace residue and these values become the new amplitudes of the three atoms.

$$A_1 f_1(t_i) + A_2 f_2(t_i) + A_3 f_3(t_i) = S(t_i)$$

$$A_1 f_1(t_j) + A_2 f_2(t_j) + A_3 f_3(t_j) = S(t_j)$$

$$A_1 f_1(t_k) + A_2 f_2(t_k) + A_3 f_3(t_k) = S(t_k) \quad \text{(Eq. 5)}$$

Here, $A_1$, $A_2$ and $A_3$ are the respective amplitudes of the atom sequences given by $f_1(t)$, $f_2(t)$ and $f_3(t)$, which become the variables of the simultaneous equation. S(t) is the value of the seismic trace at the three different values of t.

The atom amplitudes are allowed to become the variable parameters, while instead certain key points on the trace are "fixed" (i.e. peaks or troughs of either the real or imaginary parts of the analytic trace). This process results in a number of alternative (amplitude) parameters being suggested for the atoms in question in addition to their current parameters. The parameter set which lowers the objective function the most is then selected. Two different objective functions for optimisation are used within the HDFD process. For the first optimisation pass after matching, the objective function is simply calculated as the trace residue energy so the aim is the same as for Matching Pursuit: to minimise residual energy left by matched atoms.

The first optimisation iteration method includes the following steps:

Choosing up to three atoms contributing to bad matching locations;

Calculating four alternative atom pairs/trios based on fixing different combinations of peaks and troughs within the overlapping section of either the real or imaginary parts of the analytic seismic trace and varying the atom amplitudes;

Choosing the best out of the five atom combinations (including the original), based on the criterion of minimising the residual energy, to replace the original atoms;

Recursively repeating the process across the whole trace until every section of the trace has been (attempted to be) optimised.

FIG. 17 shows the first matching pass approximation 132 (also referenced as matching pass approximation J) of the seismic trace 100. It is clearly shown that the effect of co-optimising multiple atoms at once is to provide a better approximation to the seismic trace in regions of constructive or destructive interference between the atoms.

Figure 18:
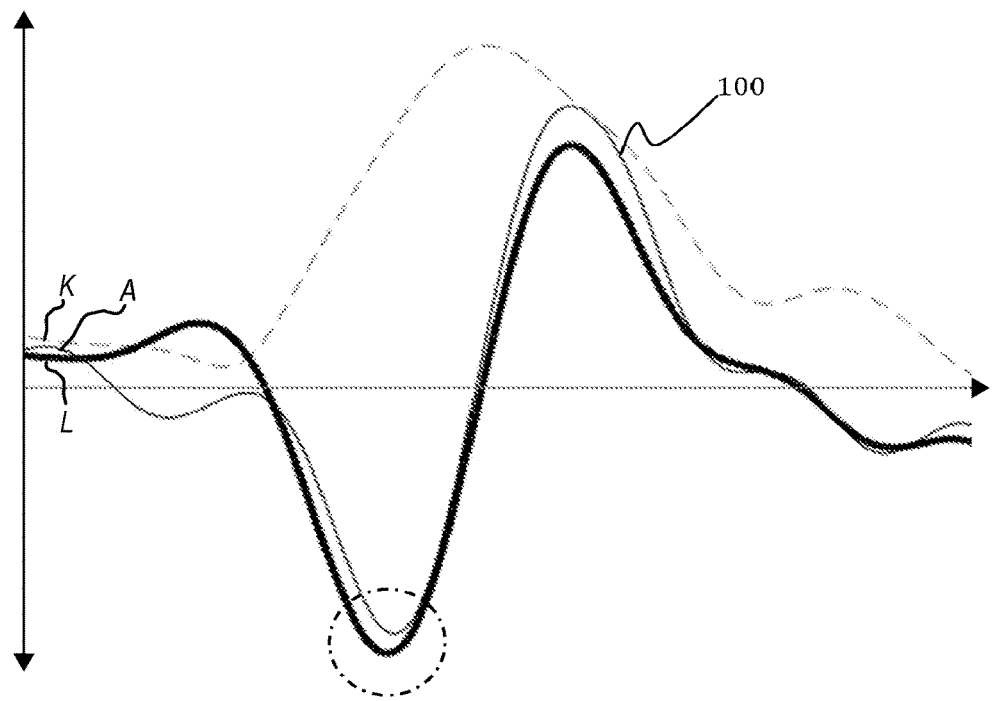
FIG. 18 shows a second optimisation pass start point, and an over-estimation reduction optimisation.
Figure 19:
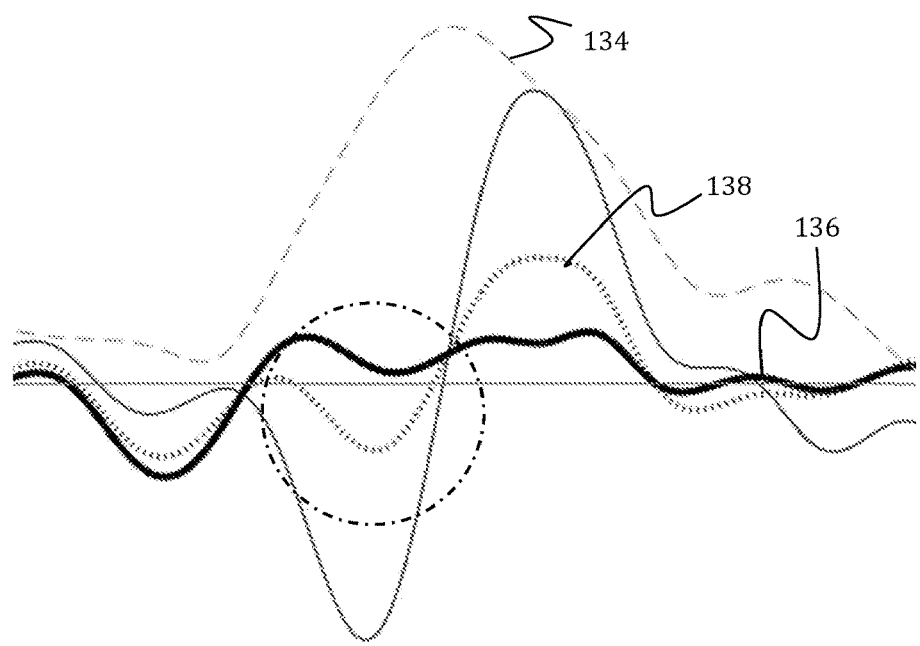
FIG. 19 shows a second optimisation pass residues of the over-estimation reduction optimisation.

Referring now to FIGS. 18 and 19, the first matching pass is followed by a residue optimisation pass, which generally results in a trace approximation and which picks up 90% or more of the trace energy. However, in order to achieve a more accurate decomposition it is still required to perform a second atom matching pass. This matching pass must be done against the trace residue in order to reduce its energy, but by this point in the process, the trace residue bears no resemblance to either seismic nor to the Gabor wavelets that are attempted to match. The problem of the signal, at locations of significant event interference, not resembling the dictionary wavelets is a common one throughout different methods of dictionary-based wavelet matching by a greedy sequential algorithm. However, the problem can be lessened by embedding some knowledge into the system beyond simply reducing trace residue. In particular, that matched atoms should, wherever possible, be of the same polarity as the seismic trace at the atom location.

The previous optimisation pass did not distinguish between, whether the seismic energy matched by an atom was an over-estimate or an under-estimate of the true energy, but only that the total error (residue) was minimised.

To better setup the second matching pass, the HDFD algorithm includes a second optimisation iteration first. This iteration uses a more complex objective function than the previous, balancing out residue energy (which is still important) with also minimising the over-estimate caused by atom matching. The result of this iteration is an atom decomposition which usually has a slightly higher residual than at the end of the previous iteration, but that residual is mostly in the form of under-estimation of trace energy.

FIG. 18 shows an example of over-estimation reduction optimisation. Here, the initial matched atom approximation L does not match the original seismic trace 100 perfectly. In some cases, as highlighted (circle), the atom approximation matches more energy than is present in the trace 100—i.e. it introduces energy.

Subsequently, as shown in FIG. 19, the second matching iteration takes the residual output from the previous iteration (see FIG. 18), calculates the envelope 134 (also referenced as envelope K) of this and matches atoms to the envelope peaks similar to the first matching pass. The minimisation of trace overestimation in the previous iteration means that at this stage, most atoms added should be of the same polarity as the seismic trace 100, adding to the energy matched by a previous atom rather than countering it.

The only other difference from the first matching pass is that, the matching is now to an arbitrary residue, rather than the seismic trace, some atoms are rejected as being too dissimilar to the seismic trace 100. Therefore, for an atom to be added, it must match the trace residue well, in order to reduce this, but the atom is also checked against the seismic as a second level of acceptance. In FIG. 19, the optimised matched atom residue 136 (also referenced as the optimized matched atom residue M) and the over estimated reduced estimate 138 (also referenced as the over estimated reduced estimate N) are disclosed.

In summary, the objective function to minimise during this pass is given by:

$$f(t) = f_{residue}(t) + f_{overestimate}(t) \quad \text{(Eq. 6)}$$

$f_{residue}(t)$ is calculated as the residual energy of the current trace with a short (length 3) mean filter applied to eliminate spikes and give a more robust measure;

$f_{overestimate}(t)$ is calculated by subtracting the mean smoothed envelope of the atom-matched approximation from the mean-smoothed trace envelope. The overestimate is then defined as the sum of the positive values (i.e. the over-estimated values) resulting from this;

Combining the two criteria means that it is ensured that the residual energy as a whole remains low, but that a slight temporary increase in this is accepted, if it allows for a reduction in the introduced trace energy.

Similarly to the optimisation iteration which took place after the $1^{st}$ atom matching pass an identical iteration is performed to finalise the result by optimising the newly added atoms into the previous set. This is done using the objective function whose sole purpose is to minimise the trace residue.

The result of the decomposition process described so far is a set of atoms for each trace 100. When constructed with their exact parameters, these give the full trace reconstruction. For frequency-based reconstruction, each atom has its amplitude moderated by an amount relative to the distance between the atom's central frequency and the frequency at which the trace is being constructed.

Figure 20:
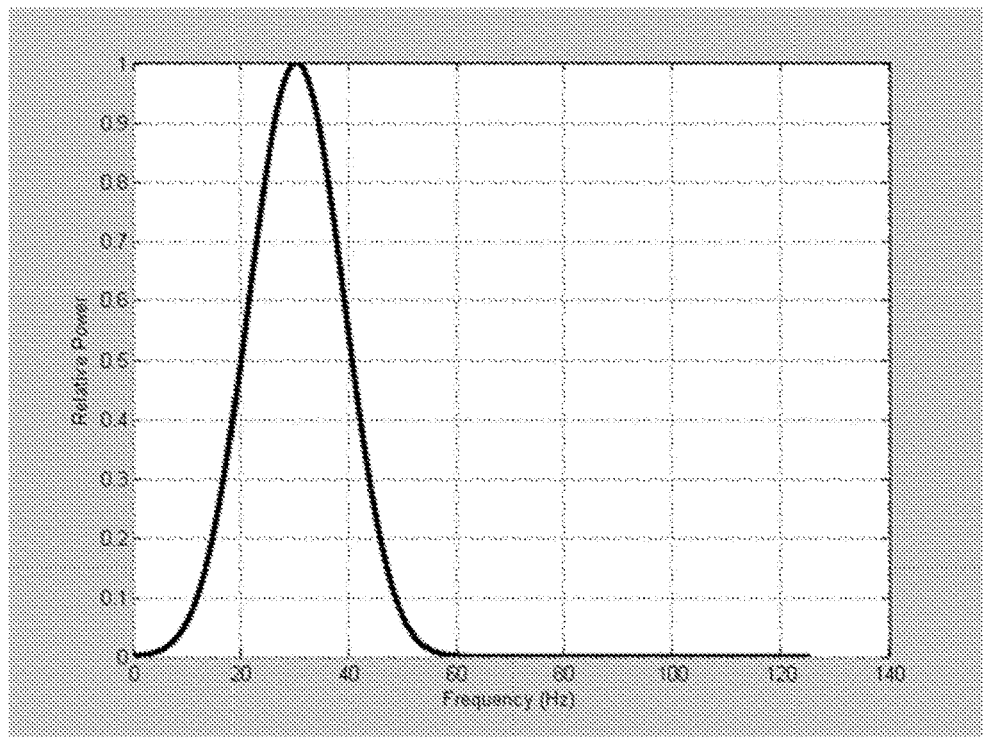
FIG. 20 shows an example of a frequency-based reconstruction, where the frequency spectrum for a 30 Hz Gabor wavelet shows that the atom has its maximum power at 30 Hz, but falls away symmetrically to only about 50% of its peak power at 20 Hz or 40 Hz, meaning that for a 20 Hz frequency reconstruction any atom with a central frequency of 30 Hz is summed into the results with only 50% of its amplitude.
Figure 21:
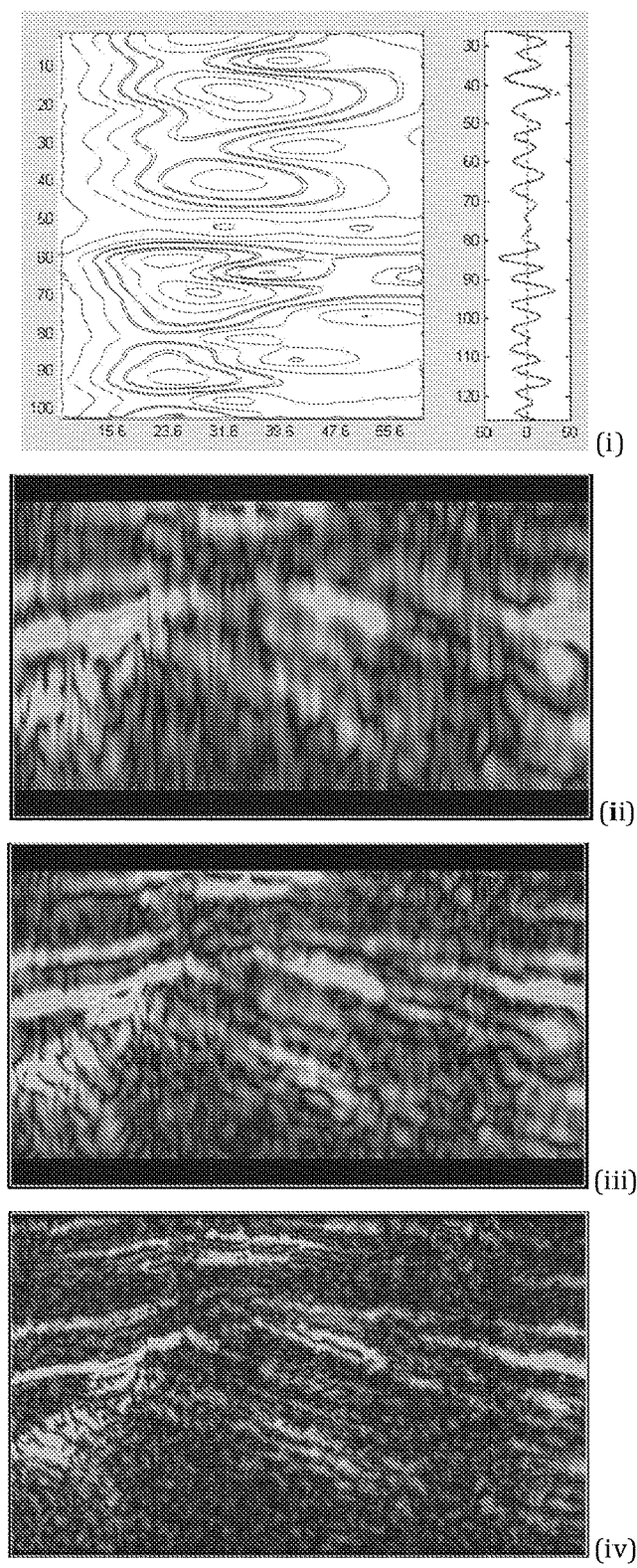
FIG. 21 shows examples of a visual representation of (i) a seismic trace and its Gabor scale-space expansion, (ii) a Fourier Transform at 20 Hz output, (iii) a wavelet transform at 20 Hz output, and (iv) a HDFD according to the present invention at 20 Hz output

One important property of the Gabor atoms used within the HDFD algorithm is that their representation in the frequency domain is a Gaussian curve centred at the atom's central frequency. This curve is used to determine what percentage of its full power (amplitude) an atom should be reconstructed into the signal at. For example, as shown in FIG. 20, a 40 Hz atom will have 100% of its power when reconstructed at 40 Hz, but this power falls away under the Gaussian curve until at ca. 30 Hz the atom only has half its power. This means that it will be added into the full trace reconstruction at only 50% of its amplitude. Conversely, a 30 Hz atom will be added in at 100% of its amplitude, but this would drop to somewhere around 50% for a trace reconstruction at 40 Hz.

During the frequency reconstruction, no other parameters of the atoms are altered for different frequencies, so the phase and location of all atoms remains the same at all frequencies of reconstruction.

FIG. 20, shows a comparison of an example of visual representations of (i) a seismic trace and its Gabor scale-space expansion, (ii) a Fourier Transform at 20 Hz output, (iii) a wavelet transform at 20 Hz output, and (iv) a HDFD according to the present invention at 20 Hz output. It is evident that the representation using the HDFD algorithm of the present invention provides the highest resolution allowing more detailed information to be identified.

Parameters Affecting the HDFD Output

There are a number of parameters and other factors that can affect the output produced by HDFD. Some of these are not quantifiable, but can have a significant impact.

Trace Complexity

In particular the complexity of the data set can be a key factor. A dataset with a significant amount of interference between events will behave less well under the algorithm than one in which the interference is more limited.

This does not mean that traces with high interference will not produce good results, more that the individual atoms matched may be less accurately mapped to seismic events than in areas of low interference. This is simply a property of the atom dictionary and the sequential, deterministic nature of the algorithm. The dictionary defined that Gabor wavelets are what is being matched to the trace so if the interference patterns in the trace cause it to bear little resemblance to the shape of a wavelet in places then the matches here will, of necessity, be less accurate. The second matching pass, combined with the optimisation passes aim to minimise this problem by allowing overlapping atoms to be re-evaluated together rather than simply being added in a strictly greedy sequence as they would be in Matching Pursuit.

Noise

The HDFD algorithm works best on noise-cancelled data. As in the case of very complex traces discussed in the previous section, the less the data resembles Gabor wavelets the less accurate will be the matches. On the other hand, since wavelets are being matched to the trace, it may often be the case that a significant proportion of the residue that is left behind when matching to noisy data is the noise itself since the residue will contain those elements which represent the difference between the shapes in the trace and the shapes of the Gabor wavelets used to represent seismic events.

Dictionary Size

Dictionary size has been found to have a minimal effect on the HDFD algorithm output. During the development of this new HDFD algorithm, a number of different dictionary sizes were investigated, from 1 Hz to 10 Hz frequency steps. Due to the frequency domain interpolation and the multiple matching iterations the impact of having a much coarser dictionary are minimal and in some cases even resulted in a lower trace residue than running a much larger dictionary. As a result of these investigations, a small dictionary size was chosen.

Dictionary Functions

HDFD utilises Gabor wavelets due to their strong resemblance to seismic events, well parameterised complex definition and a well defined Gaussian frequency representation. This means that they have the best joint time-frequency resolution among similar functions. Using the analogy of Heisenberg's Uncertainty Principle, the error box of time vs. frequency is a square for Gabor wavelets, meaning that they provide a half-way balance between time resolution and frequency resolution.

Similarly to Matching Pursuit, there is no reason (at least in theory) why the algorithm would not work when parameterised with a completely different dictionary or an extended dictionary of Gabor wavelets plus other types of wavelets. At its current state, the algorithm is not yet sufficiently modular to simply plug in a different dictionary and run without any changes to the implementation, but the algorithm itself is not constrained to using Gabor wavelets.

Frequency Selection

Due to the fact that Gabor wavelets have a Gaussian distribution in the frequency domain there are no sharp dropouts at nearby frequencies as a Fourier-based decomposition might give. Therefore the output at 39 Hz will be very similar to the output at 40 Hz, because any atom contributing significantly at one frequency will contribute very similarly at the other. For this reason blends of frequencies that are very close to each other will naturally tend to take the form of subtle variations away from the main greyscale axis rather than bright colours representing significant differences. A greater spread of frequencies will result in more significant colour variation in the resultant RGB Blend.

Alternative Embodiment Applying a Modified HDFD

Figure 22:
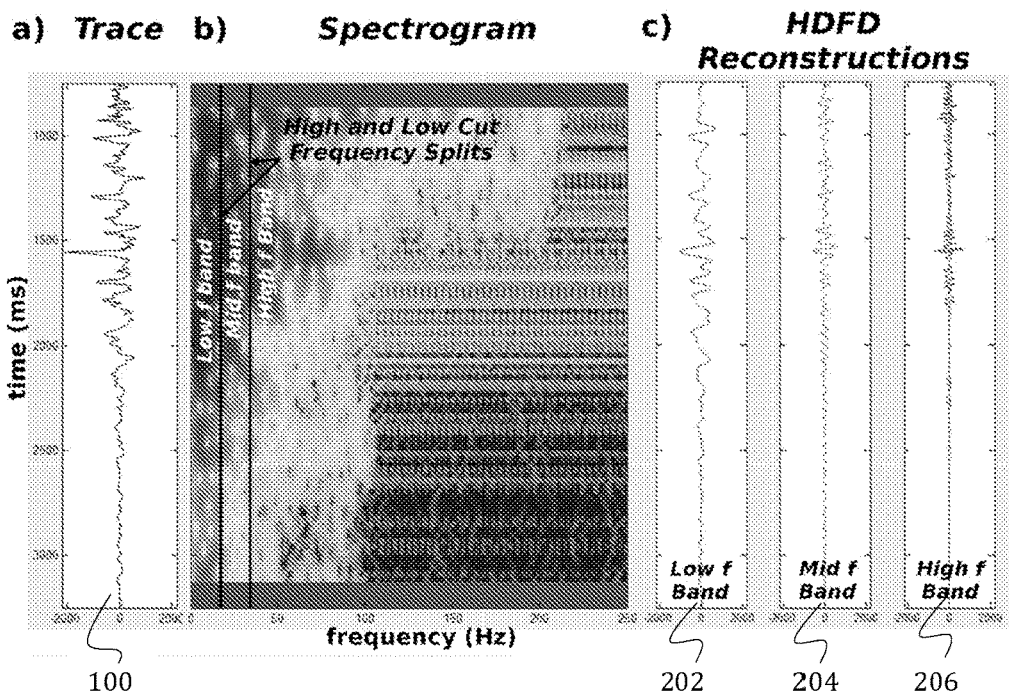
FIG. 22 shows (a) an example broadband seismic trace, (b) the spectrogram of said example seismic trace and (c) a modified HDFD reconstruction for the low-, mid-, and high frequency band-limited sections according to an another embodiment of the invention.

In another embodiment of the present invention, prior to the Matching Pursuit stage and in addition to dividing the seismic trace 100 up into independent sections 102, 104, the seismic trace 100 is further sub-divided into, for example, three band-limited frequency sections 202, 204, 206. An example of three band-limited frequency sections 202, 204, 206 of the seismic trace 100 is shown in FIG. 22, which illustrates the steps from a seismic trace 100 (FIG. 22 (a)) into a spectrogram (highlighting three frequency bands in FIG. 22 (b)) and then into the HDFD trace reconstruction (i.e. the sum of matched wavelets) within the three band-limited frequencies (FIG. 22 (c)).

Introducing low and high "cuts" (frequency limits) produces low, mid and high frequency sections for wavelets to be matched to, thus, forcing the wavelets to be fitted to the spectral extremes that may have previously been "overlooked". In addition, the wavelet dictionary may be extended beyond the "hard-coded" limits in the preferred embodiment described earlier. For example, the wavelet dictionary may be extended to one octave above the high cut 210 and one octave below the low cut 208, ensuring that appropriate matching can take place. In the next stage, the band limited wavelet sets are combined and frequency reconstruction is performed as described in the preferred embodiment of the present invention.

Figure 23:
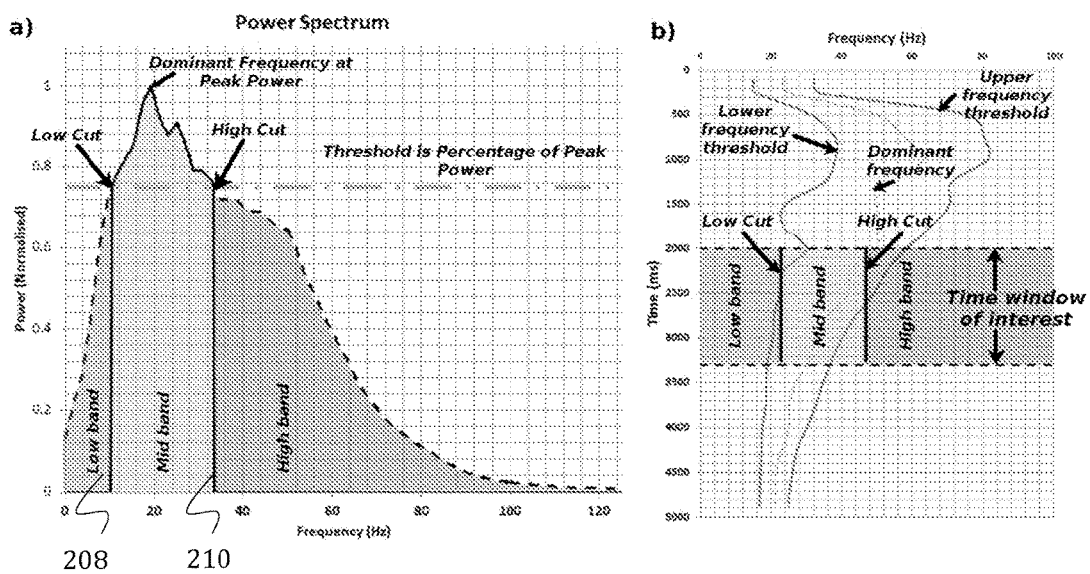
FIG. 23 shows (a) a power spectrum taken at single time slice showing high and low cut "thresholded" on percentage of peak power, and (b) a time variance of high and low cut based on percentage peak power that is averaged over a time window.
Figure 24:
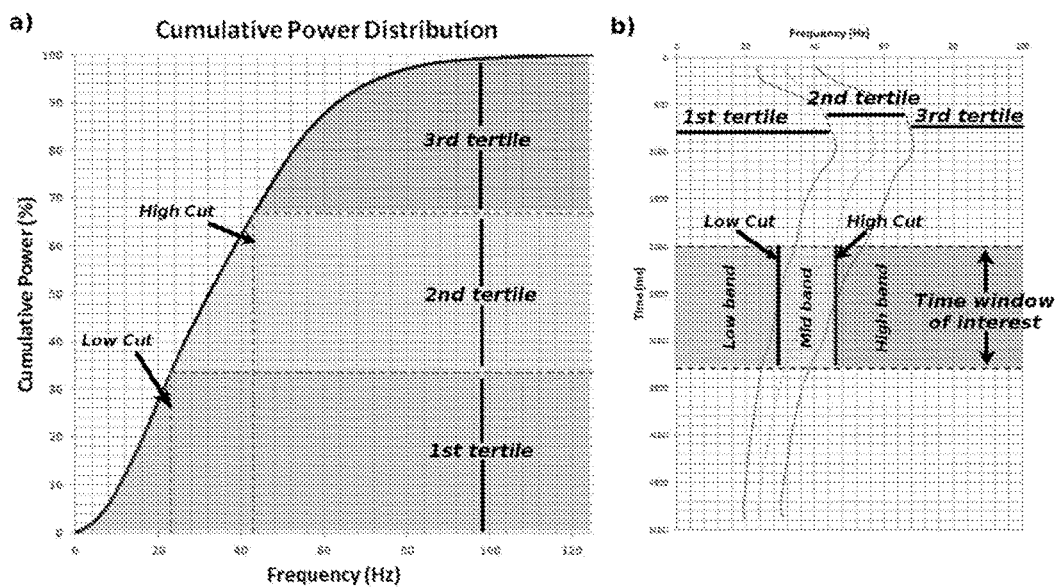
FIG. 24 shows (a) a cumulative power distribution taken at a single time slice showing high and low cut "thresholded" on first, second and third tertiles, and (b) a time variance of high and low cut based on cumulative power that is averaged over a time window.
Figure 25:
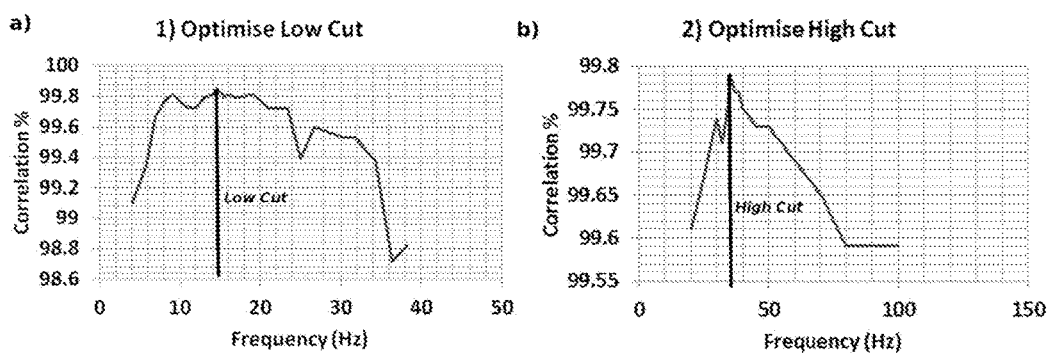
FIG. 25 shows the optimisation of a HDFD correlation by varying (a) the low cut frequency and (b) the high cut frequency.

In order to determine the high and low frequency limits ("cuts") different methods may be applied. Three examples for determining the frequency limits are illustrated in FIGS. 23, 24 and 25. The applied methods may be:

(i) Pre-Determined High and Low Frequency Limits

This method requires no optimisation and the splits between the band-limited frequency sections are simply "hard-coded" (i.e. predetermined) to be representative of the typical frequency range of the seismic data.

(ii) High and Low Frequency Limits Determined at Percentage of Peak Power

In this method, the predominant frequency is a measurement of frequency at peak power (see FIG. 23 (a)). High and low cuts 208, 210 may be derived from the peak power by determining a range at a given percentile power (e.g. 75%). The high frequency limit being the uppermost frequency in this percentile power range and the low frequency limit being the lowermost frequency in this range. The upper and lower frequency limits are further time variant functions and in order to reduce these to a single high-, low frequency limit, the time variant functions are averaged over a predetermined time window.

(iii) High and Low Frequency Limit Determined on Cumulative Power Distribution

In this method, the cumulative power [%] is plotted versus the frequency and the resulting distribution is divided into quantiles (e.g. tertiles) (FIG. 24 (a)). The low frequency limit is then taken to be the upper range of the first tertile, and the high frequency limit is taken to be the upper range of the second tertile. If necessary, different cumulative power thresholds may be used to determine the frequencies. The upper and lower frequency limits are also time variant functions and in order to reduce these to a single high-, low frequency limit, the time variant functions are averaged over a predetermined time window (FIG. 24 (b)). Any other suitable quantile may be used to determine the frequency "cuts".

It is understood that the upper and lower limits define, for example, exactly all three band-limited sections and there may be no overlap between the sections such that none of the available frequencies are excluded i.e. the three band-limited frequency sections in the described example cover all discrete frequencies, each in exactly one of the three.

(iv) High and Low Frequency Limit Determined Through Optimisation of HDFD Correlation Coefficient Referring now to FIGS. 25 (a) and (b), a correlation provided between the HDFD reconstruction and the original seismic trace. The low frequency limit and high frequency limit are then varied and the correlation is recalculated. This is repeated iteratively until the correlation between the HDFD reconstruction and the original seismic trace is at its maximum at which point high and low cut frequencies are provided that will produce the best possible HDFD reconstruction.

Figure 26:
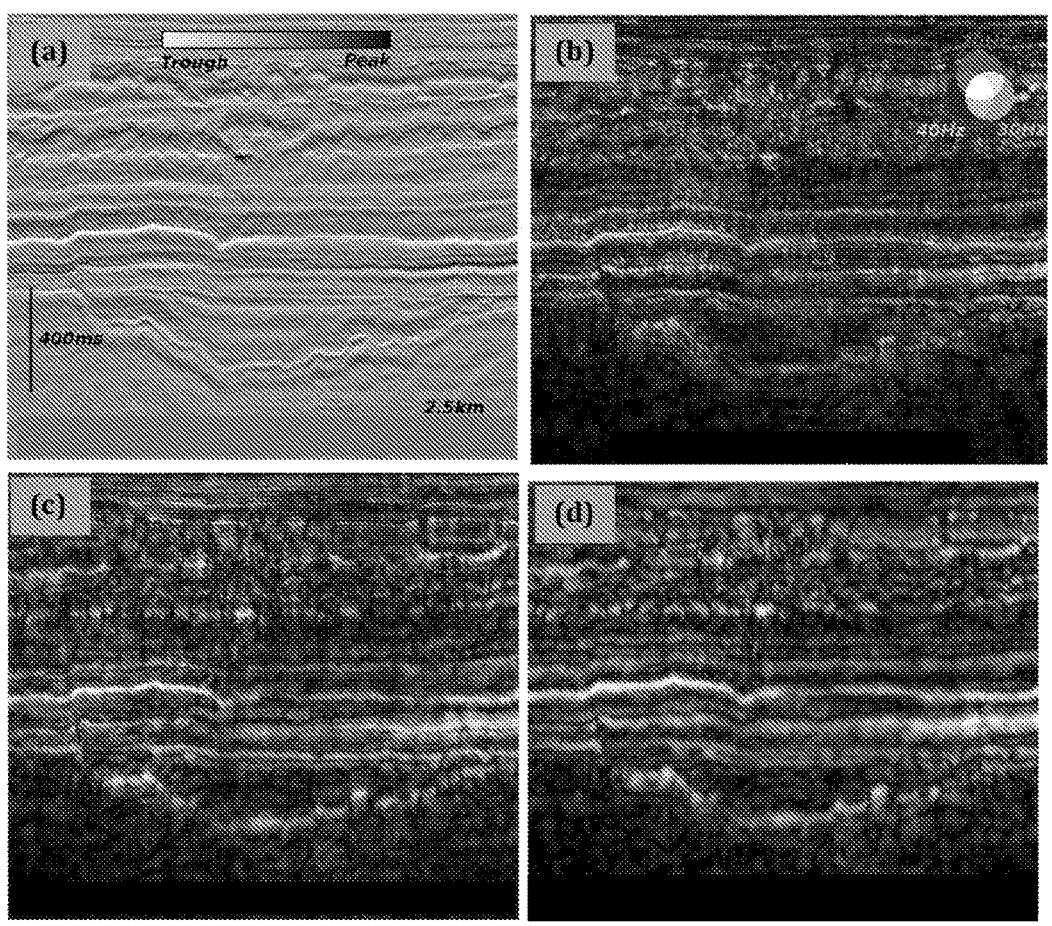
FIG. 26 shows (a) an example broadband seismic data set; (b) a frequency decomposition RGB blend generated using HDFD of the preferred embodiment of the present invention; (c) a frequency decomposition RGB blend generated using HDFD of another, modified embodiment of the present invention (i.e. split of seismic trace into band-limited frequency section prior to the Matching Pursuit step), and (d) a standard "constant-q" band-pass decomposition.

Referring now to FIG. 26, the preferred embodiment of the HDFD and the alternative other embodiment of the HDFD (i.e. including additional step of splitting seismic trace into band-limited frequency sections) are compared to a standard constant-q band pass composition, wherein FIG. 26 (*a*) shows an example broadband seismic data set, FIG. 26 (*b*) illustrates a frequency decomposition RGB blend generated using the HDFD of the preferred embodiment of the present invention, FIG. 26 (*c*) illustrates a frequency decomposition RGB blend generated using HDFD of the alternative, modified embodiment of the present invention (seismic trace is split into three band-limited frequency sections), and FIG. 26 (*d*) illustrates the standard "constant-q" band-pass decomposition.

It will be appreciated by persons skilled in the art that the above embodiments have been described by way of example only and not in any limitative sense, and that various alterations and modifications are possible without departing from the scope of the invention as defined by the appended claims.

Appendix—Background Information on Gabor Wavelets

The HDFD uses Gabor Wavelets as follows:

$$f(t) = Ae^{-\pi \frac{t^2}{\sigma^2}}$$

$$F(\omega) = A \int_{-\infty}^{+\infty} e^{-\pi \frac{t^2}{\sigma^2}} \cdot e^{j\omega t} dt$$

$$= A \int_{-\infty}^{+\infty} e^{-\pi \frac{t^2}{\sigma^2} - j\omega t} dt$$

$$F(\omega) = A \int_{-\infty}^{+\infty} e^{-at^2 + bt} dt$$

$$= Ae^{\frac{b^2}{4a}} \int_{-\infty}^{+\infty} e^{-at^2 + bt - \frac{b^2}{4a}} dt$$

$$= Ae^{\frac{b^2}{4a}} \int_{-\infty}^{+\infty} e^{-\left(t\sqrt{a} - \frac{b}{2\sqrt{a}}\right)^2} dt$$

$$= Ae^{\frac{b^2}{4a}} \cdot \sqrt{\frac{\pi}{a}}$$

$$= A\sigma e^{-\frac{\sigma^2 \omega^2}{4\pi}}$$

$$F(k) = A\sigma e^{-\pi\sigma^2 k^2}$$

$$= A\sigma e^{-\pi(\sigma k)^2}$$

$$f(t) = Ae^{-\pi \frac{t^2}{\sigma^2}} \cdot e^{j\omega_0 t} \leftrightarrow F(\omega - \omega_0) = A\sigma e^{-\frac{\sigma^2}{4\pi}(\omega - \omega_0)^2}$$

$$f(t) = Ae^{-\pi \frac{t^2}{\sigma^2}} \cdot e^{\frac{j2\pi t}{\sigma}} \leftrightarrow F\left(k - \frac{1}{\sigma}\right) = A\sigma e^{-\pi(\sigma k - 1)^2}$$

The invention claimed is:

1. A method, implemented at a computer system that includes one or more processors, for visually enhancing at least one geological feature in 3D seismic survey data detected by an array of seismic receivers proximate an area of the substrata to be evaluated, comprising the steps of:
   (a) receiving 3D seismic survey data detected by the array of seismic receivers;
   (b) selecting at least one first seismic trace from a 3D seismic survey dataset compiled from the received 3D seismic survey data;
   (c) subdividing said at least one first seismic trace into a plurality of identified characteristic segments;
   (d) generating at least one first analytical model function for each of said plurality of identified characteristic segments, utilizing at least one adapted wavelet from an existing dictionary;
   (e) determining a minimized residual trace energy function based on a predetermined threshold between said at least one first seismic trace and said at least one first analytical model function;
   (f) optimizing said at least one first analytical model function with respect to said minimized residual trace energy function;
   (g) repeating steps (e) and (f) until a predetermined condition is met, and
   (h) generating a model dataset from said optimized at least one first analytical model function for at least part of said at least one first seismic trace for visual representation, wherein the visual representation is a frequency decomposition color blend, and
   (i) displaying the frequency decomposition color blend on a display device, the frequency decomposition color blend illustrating a visually enhanced geological feature for improving accuracy of geological modeling and seismic interpretation,
   wherein said predetermined condition in step (g) is any one of a minimum of the trace energy overestimate between said at least one first seismic trace and said at least one first analytical model function, or a joint minimum of the trace residual energy and the trace energy overestimate between said at least one first seismic trace and said at least one first analytical model function.

2. The method according to claim 1, wherein said at least one first seismic trace is subdivided utilizing an analytic trace envelope function for said at least one first seismic trace.

3. The method according to claim 2, wherein said characteristic segments are identified salient events of said analytic trace envelope function.

4. The method according to claim 3, wherein said salient events are characteristic peaks of said analytic trace envelope function for said at least one first seismic trace.

5. The method according to claim 3, wherein said salient events are intervals contained between pairs of troughs of said trace envelope function for said at least one first seismic trace.

6. The method according to claim 1, wherein in step (d) a plurality of wavelets are utilized independently of each other from a plurality of existing dictionaries.

7. The method according to claim 1, wherein said minimized residual trace energy function in step (e) is determined from a residual trace signal between said at least one first seismic trace and said at least one first analytical model function.

8. The method according to claim 7, wherein said at least one first analytical model function is optimized so as to minimize a residual energy function with said at least one first seismic trace.

9. The method according to claim 1, wherein step (f) includes optimizing said at least one adapted wavelet in respect of any one or all of amplitude, position, scale, frequency and phase.

10. The method according to claim 1, wherein step (f) includes the step of adding one or more adapted wavelets to said at least one first analytical model function.

11. The method according to claim 1, wherein steps (d) through (g) are repeatedly applied to subsequent residual traces in order to generate adapted wavelets to further extend the first analytical model function.

12. The method according to claim 1, wherein said model dataset is a band-limited model dataset at a predetermined frequency of said at least one first seismic trace.

13. The method according to claim 1, wherein said model dataset is a triplet of band-limited model dataset at three predetermined frequencies of said at least one first seismic trace.

14. The method according to claim 1, wherein said model dataset is an approximate reconstruction of the entire signal utilizing the complete first analytical model function of said at least one first seismic trace.

15. The method according to claim 1, wherein said model dataset is a representation of one or more of the adapted wavelet parameters of the first analytical model function of said at least one first seismic trace.

16. The method according to claim 1, wherein a plurality of seismic traces of said 3D seismic survey dataset are processed in parallel.

17. The method according to claim 1, wherein a plurality of seismic traces of said 3D seismic survey dataset is processed sequentially.

18. The method according to claim 1, wherein step (c) includes the step of sub-dividing said at least one first seismic trace into a plurality of band-limited frequency sections in addition to said plurality of identified characteristic segments.

19. The method according to claim 18, wherein each one of said plurality of band-limited frequency sections is defined by a predetermined lower and upper frequency limit, different from said predetermined lower and upper frequency limit of any other of said plurality of band-limited frequency sections.

20. The method according to claim 18, wherein each one of said plurality of band-limited frequency sections is defined by a lower and upper frequency limit derived from a predetermined peak power of a frequency power spectrum over a predetermined time period, wherein the upper frequency limit is at the uppermost frequency of the predetermined peak power and the lower frequency limit is at the lowermost frequency of the predetermined peak power.

21. The method according to claim 18, wherein said at least one first seismic trace is sub-divided into band-limited low-, mid- and high frequency sections.

22. The method according to claim 18, wherein each one of said plurality of band-limited frequency sections is defined by a lower and upper frequency limit derived from the cumulative power distribution of said at least one first seismic trace.

23. The method according to claim 22, wherein said lower and upper frequency limits are derived from predetermined quantiles of said cumulative power distribution.

24. The method according to claim 18, wherein said existing dictionary in step (d) is extended by at least one octave above an uppermost frequency limit and at least one octave below a lowermost frequency limit of said plurality of band-limited frequency sections.

25. A computer program product comprising one or more hardware storage devices having stored thereon computer-executable instructions that are executable by one or more processors of a computer system to perform the method of claim 1.

* * * * *